US012755540B2

(12) United States Patent
Suzuki et al.

(10) Patent No.: US 12,755,540 B2
(45) Date of Patent: Oct. 6, 2026

(54) COMPUTER-READABLE RECORDING MEDIUM, FRAUD DETECTION METHOD, AND FRAUD DETECTION APPARATUS

(71) Applicant: FUJITSU LIMITED, Kawasaki (JP)

(72) Inventors: Genta Suzuki, Kawasaki (JP); Sho Iwasaki, Yokohama (JP); Takahiro Saito, Asaka (JP); Yuka Jo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 17/744,727

(22) Filed: May 16, 2022

(65) Prior Publication Data

US 2023/0005267 A1 Jan. 5, 2023

(30) Foreign Application Priority Data

Jun. 30, 2021 (JP) ................................ 2021-108655
Feb. 21, 2022 (JP) ................................ 2022-025140

(51) Int. Cl.
*G06V 20/52* (2022.01)
*G06K 7/14* (2006.01)
(Continued)

(52) U.S. Cl.
CPC ........... *G06V 20/52* (2022.01); *G06K 7/1413* (2013.01); *G06Q 20/4016* (2013.01); *G06T 7/20* (2013.01);
(Continued)

(58) Field of Classification Search
USPC ........................................................... 705/44
See application file for complete search history.

(56) References Cited

U.S. PATENT DOCUMENTS 10,266,196 B1 * 4/2019 Sinha ...................... B62B 3/008
10,807,627 B2 * 10/2020 Hagen ..................... H04W 4/38
(Continued)

FOREIGN PATENT DOCUMENTS

EP 3 422 309 A1 1/2019
EP 3940614 A1 * 1/2022 ............ G06Q 30/06
(Continued)

OTHER PUBLICATIONS

Title: Grab: Fast and Accurate Sensor Processing for Cashier-Free Shopping Authors: Xiaochen Liu et al. Date: Jan. 4, 2020 (Year: 2020).*
(Continued)

*Primary Examiner* — Bennett M Sigmond
*Assistant Examiner* — Yongsik Park
(74) *Attorney, Agent, or Firm* — XSENSUS LLP

(57) ABSTRACT

An information processing program causes a computer to execute a process including: specifying, from an image that is captured by a camera, a person and a plurality of objects, generating, by inputting the image of the person into a machine learning model, skeleton information on the person, identifying, based on the plurality of objects and the skeleton information, a first feature value associated with one or more first motions of the person who retrieves an object from among the plurality of objects, identifying a second feature value associated with one or more objects registered to a first terminal by the person from among the plurality of object, and generating, based on a difference between the first feature value and the second feature value, an alert indicates that an object retrieved by the person is not registered in the first terminal.

19 Claims, 21 Drawing Sheets

(51) Int. Cl.

| | |
|---|---|
| ***G06Q 20/40*** | (2012.01) |
| ***G06T 7/20*** | (2017.01) |
| ***G06V 10/40*** | (2022.01) |
| ***G06V 10/70*** | (2022.01) |
| ***G06V 40/10*** | (2022.01) |
| ***G06V 40/20*** | (2022.01) |
| *G08B 13/00* | (2006.01) |

(52) U.S. Cl.
CPC .............. *G06V 10/40* (2022.01); *G06V 10/70* (2022.01); *G06V 40/10* (2022.01); *G06V 40/20* (2022.01); *G06T 2207/10016* (2013.01); *G06T 2207/30196* (2013.01); *G08B 13/00* (2013.01)

(56) References Cited

U.S. PATENT DOCUMENTS

| | | | | |
|---|---|---|---|---|
| 11,392,889 | B1 * | 7/2022 | Degranville | G06Q 10/087 |
| 11,620,879 | B2 * | 4/2023 | Zalewski | H04W 4/80 705/26.8 |
| 11,741,447 | B1 * | 8/2023 | Matheson | B62B 3/1408 705/21 |
| 2015/0039458 | A1 * | 2/2015 | Reid | A61B 5/117 705/26.1 |
| 2017/0046707 | A1 | 2/2017 | Krause et al. | |
| 2017/0316397 | A1 * | 11/2017 | Miyagi | G06F 21/32 |
| 2019/0327451 | A1 * | 10/2019 | Takeno | G06V 20/41 |
| 2021/0177163 | A1 * | 6/2021 | Cohn | G06Q 20/18 |
| 2022/0198550 | A1 * | 6/2022 | Meidar | G06Q 20/20 |

FOREIGN PATENT DOCUMENTS

| | | | | |
|---|---|---|---|---|
| JP | 2019-193089 | A | 10/2019 | |
| JP | 6653813 | B1 * | 2/2020 | G07G 1/00 |
| JP | 2021135620 | A * | 9/2021 | |
| JP | 2022127013 | A * | 8/2022 | G07G 1/12 |
| WO | WO-2006105376 | A2 * | 10/2006 | G07F 19/207 |
| WO | WO-2018021229 | A1 * | 2/2018 | F25D 11/00 |
| WO | WO-2020222236 | A1 * | 11/2020 | G06V 10/225 |
| WO | WO-2021137190 | A1 * | 7/2021 | G06Q 10/087 |

OTHER PUBLICATIONS

Official Notification informing Information Submission from Third-Party mailed Jul. 11, 2023, in the corresponding Japanese Patent Application No. 2022-025140, 9pp.
Japanese Office Action mailed on Apr. 4, 2023 for the corresponding Japanese patent application No. 2022-025140, 9pp.
Extended European Search Report issued Nov. 11, 2022, in corresponding European Patent Application 22179872.1.

* cited by examiner

FIG.6

| PERSONAL ID | PUT-INTO-BASKET MOTION COUNT Nk | COMMODITY PRODUCT REGISTRATION MOTION COUNT Ns |
|---|---|---|
| 1 | 5 | 0 |
| 2 | 12 | 12 |
| 3 | 14 | 6 |
| ... | ... | ... |

FIG.16

| PERSONAL ID | TIME | MOTION | COMMODITY PRODUCT CATEGORY |
|---|---|---|---|
| 1 | 2021/11/16 14:06:51 | COMMODITY PRODUCT ACQUISITION | BEER ITEM |
| 1 | 2021/11/16 14:08:12 | COMMODITY PRODUCT ACQUISITION | HBC ITEM |
| 1 | 2021/11/16 14:08:12 | COMMODITY PRODUCT ACQUISITION | PROCESSED FOOD |
| ... | ... | ... | ... |
| 2 | 2021/11/16 14:02:35 | COMMODITY PRODUCT ACQUISITION | BREAD ITEM |
| 2 | 2021/11/16 14:05:54 | COMMODITY PRODUCT ACQUISITION | SEASONING |
| 2 | 2021/11/16 14:06:48 | COMMODITY PRODUCT RETURN | BREAD ITEM |
| ... | ... | ... | ... |

FIG.17

| PERSONAL ID | NUMBER OF SCANNED REGISTRATION ENTRIES | COMMODITY PRODUCT CATEGORY |
|---|---|---|
| 1 | 1 | HBC ITEM |
| 1 | 3 | PROCESSED FOOD |
| ... | ... | ... |

COMPUTER-READABLE RECORDING MEDIUM, FRAUD DETECTION METHOD, AND FRAUD DETECTION APPARATUS

CROSS-REFERENCE TO RELATED APPLICATIONS

This application is based upon and claims the benefit of priority of the prior Japanese Patent Application No. 2021-108655, filed on Jun. 30, 2021, and Japanese Patent Application No. 2022-025140, filed on Feb. 21, 2022, the entire contents of which are incorporated herein by reference.

FIELD

The embodiments discussed herein are related to a computer-readable recording medium, a fraud detection method, and a fraud detection apparatus.

BACKGROUND

In retail stores, in order to prevent cash registers from being crowded, introduction of a system in which customers scan and register commodity products and perform checkout themselves is being facilitated. Furthermore, in recent years, introduction of a system in which customers scan commodity products at a place other than cash registers, for example, at a place of a sales floor where each of the commodity products is picked up by the customers by using an application installed in a terminal lent inside stores of the retail stores has been started. In such a system for customers to scan commodity products themselves, there is a need to detect a scan omission of a commodity product caused by a fraudulent act, such as shoplifting, or an erroneous operation.

In contrast, as a system for detecting a fraudulent behavior of a customer at retail stores, a system for detecting a suspicious behavior or a fraudulent act, such as shoplifting, of a customer by using, for example, a monitoring camera placed in a store has been developed.

Patent Document 1: Japanese Laid-open Patent Publication No. 2019-193089

Patent Document 2: U.S. Patent Application Publication No. 2017/0046707

SUMMARY

According to an aspect of an embodiment, a non-transitory computer-readable recording medium stores therein a fraud detection program that causes a computer to execute a process including specifying, from an image that is captured by a camera, a person and a plurality of objects, generating, by inputting the image of the person into a machine learning model, skeleton information on the person, identifying, based on the plurality of objects and the skeleton information, a first feature value associated with one or more first motions of the person who retrieves an object from among the plurality of objects, identifying a second feature value associated with one or more objects registered to a first terminal by the person from among the plurality of object, and generating, based on a difference between the first feature value and the second feature value, an alert indicates that an object retrieved by the person is not registered in the first terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in a motion history 33 according to the first embodiment;

FIG. 16 is a diagram illustrating an example of data stored in the motion history 33 according to the second embodiment;

FIG. 17 is a diagram illustrating an example of data stored in commodity product registration information 34 according to the second embodiment;

DESCRIPTION OF EMBODIMENTS

However, in a system for customers to scan commodity products themselves, a commodity product scan need not always be performed at sales floor of each of the commodity products, but may be performed at any location before calculation of a payment amount of commodity products to be purchased is performed. Accordingly, in some cases, it is not possible to or it is difficult to detect a scan omission of a commodity product under the condition in which the commodity product scan is allowed to be performed at any location.

Preferred embodiments of the present invention will be explained with reference to accompanying drawings. Furthermore, the present embodiment is not limited by the embodiments. In addition, each of the embodiments can be used in any appropriate combination as long as processes do not conflict with each other.

[a] First Embodiment

Figure 1:
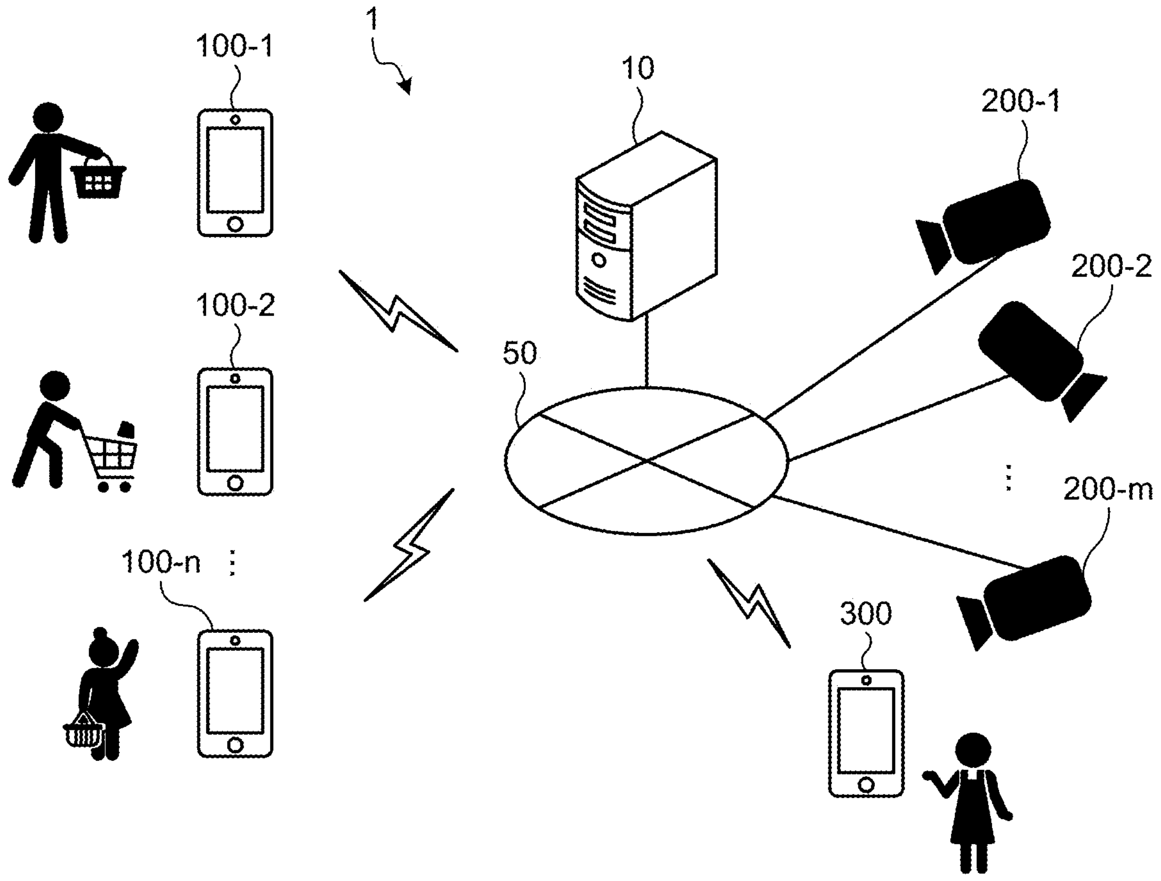
FIG. 1 is a diagram illustrating a configuration example of a fraud detection system 1 according to a first embodiment.

First, a fraud detection system for implementing the present embodiment will be described. FIG. 1 is a diagram illustrating a configuration example of the fraud detection system according to the first embodiment. As illustrated in FIG. 1, a fraud detection system 1 is a system in which the fraud detection apparatus 10, and user terminals 100-1 to 100-*n* (n is any integer. Hereinafter, collectively referred to as a "user terminal 100") are connected via a network 50 so as to be communicated with each other.

Furthermore, the fraud detection apparatus 10 is also connected to camera devices 200-1 to 200-*m* (m is any integer. Hereinafter, collectively referred to as a "camera device 200") and a store clerk terminal 300 via the network 50 so as to be communicated with each other.

Various kinds of communication network, such as an intranet, that is used inside, for example, a store of a retail store may be used for the network 50 irrespective of a wired or wireless manner. Furthermore, instead of a single network, the network 50 may be constituted of, for example, an intranet and the Internet by way of a network device, such as a gateway, or another device (not illustrated).

The fraud detection apparatus 10 is an information processing apparatus, such as a desktop personal computer (PC), a notebook PC, or a server computer, that is installed, for example, inside the store of the retail store and that is used by store staff, an administrator, or the like.

The fraud detection apparatus 10 receives, from the camera device 200, a plurality of images obtained by capturing, by the camera device 200, a predetermined image capturing range, such as the inside of the store or the site of the retail store. Furthermore, the plurality of images mentioned here are, in a precise sense, video images captured by the camera device 200, that is, a series of frames of a moving image.

Furthermore, the fraud detection apparatus 10 specifies, from a captured image by using an existing object detecting technique, a customer who visits the store (hereinafter, sometimes simply referred to as a "person"), a shopping basket carried by the person (hereinafter, sometimes simply referred to as a "basket"), or the user terminal 100. Furthermore, the fraud detection apparatus 10 generates, from the captured image by using an existing skeleton detection technique, skeleton information on the specified person, estimates a pose of the person, and specifies a motion of putting a commodity product into the basket or a motion of registering a commodity product to the user terminal 100.

Furthermore, the fraud detection apparatus 10 counts the number of motions of putting a commodity product into a basket and the number of motions of registering a commodity product to the user terminal 100, and then, evaluates a behavior of the person exhibiting with respect to a purchase of the commodity product. Then, if the fraud detection apparatus 10 detects a fraudulent act, such as a scan omission of a commodity product, performed by the person, the fraud detection apparatus 10 notifies the store clerk terminal 300 of an alert.

Furthermore, FIG. 1 illustrates the fraud detection apparatus 10 as a single computer; however, the fraud detection apparatus 10 may be a distributed computing system constituted by a plurality of computers. Furthermore, the fraud detection apparatus 10 may be a cloud computer device managed by a service provider that provides a cloud computing service.

The user terminal 100 is an information processing terminal that is used by each of the customers to scan a barcode of a commodity product by themselves in order to purchase the commodity product and register the purchased commodity product. The user terminal 100 may be a mobile terminal, such as a smartphone or a tablet personal computer (PC), owned by the customer, or a dedicated terminal that is lent inside the store. The user terminal 100 has, installed therein in advance, an application for, for example, scanning and registering commodity products.

The camera device 200 is a monitoring camera installed, for example, the inside of the store or the site of the retail store. Furthermore, FIG. 1 illustrates a plurality of the camera devices 200; however, for example, the number of the camera devices 200 may be one in a case of a small store or the like. A video image captured by the camera device 200 is transmitted to the fraud detection apparatus 10.

The store clerk terminal 300 may be a mobile terminal, such as a smartphone or a tablet PC, carried by a store clerk of the retail store, or may be an information processing apparatus, such as a desktop PC or a notebook PC, installed at a predetermined position disposed inside the store. The store clerk terminal 300 receives an alert from the fraud detection apparatus 10 in the case where a fraudulent act or an erroneous operation, such as a scan omission of a commodity product, performed by a person is detected. Furthermore, a plurality of number of the store clerk terminal 300 may be present for each store, but the terminal that receives a notification of that alert may be limited to the terminal that is carried by, for example, a store clerk responsible for security positioned in the vicinity of an exit.

Figure 2:
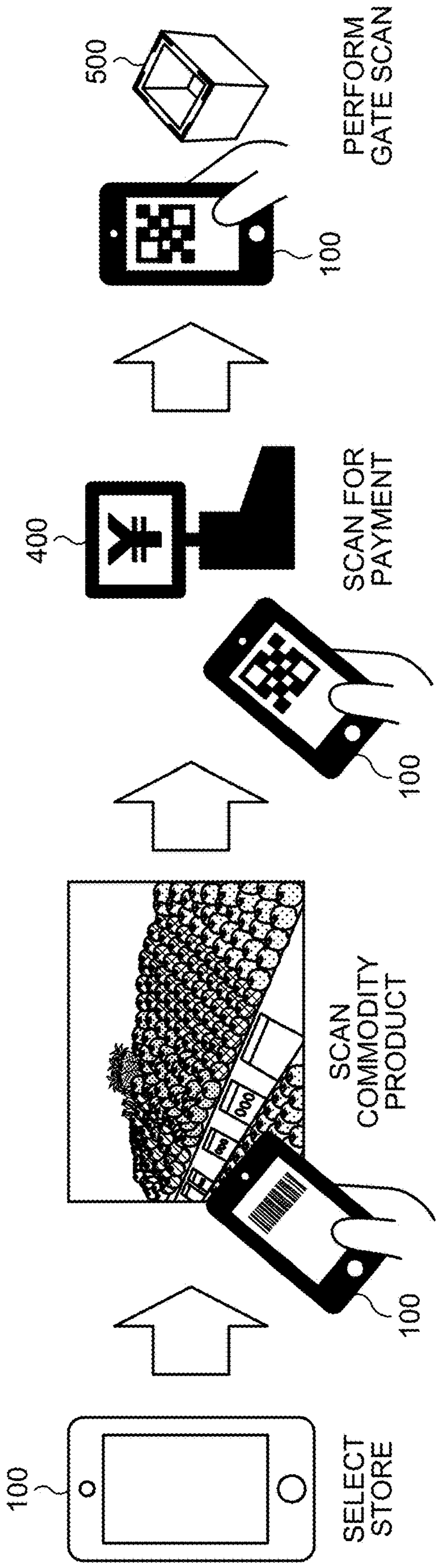
FIG. 2 is a diagram illustrating an example of a purchase of commodity products made by performing self scanning according to the first embodiment.

In the following, a method in which a customer purchases commodity products by scanning and registering commodity products by himself or herself (hereinafter, sometimes referred to as "self scanning") will be described with reference to FIG. 2 and FIG. 3. FIG. 2 is a diagram illustrating an example of a purchase of commodity products made by performing self scanning according to the first embodiment.

As illustrated in FIG. 2, first, a customer selects a visited store through an application displayed on the user terminal 100. Then, the customer picks up commodity products to be purchased and reads, for example, a barcode of each of the commodity products, a barcode attached to a commodity product shelf for each of the commodity products, or the like by using the user terminal 100 (hereinafter, sometimes referred to as a "commodity product scan"). As a result, the commodity products to be purchased are registered in the application. Furthermore, the commodity product scan need not always be performed on each of the sales floors, but may be performed at any location and any timing.

Then, the customer scans a payment code displayed on a display unit of, for example, the self-service checkout terminal 400. Then, by making payment of an amount displayed on a payment screen of the self-service checkout terminal 400, the purchase of the commodity products has been completed. Furthermore, the customer is able to exit the store by causing a gate reader 500 or the like installed at the exit of the store or the like to read a payment completion code displayed on the user terminal 100. Furthermore, although not illustrated in FIG. 1, the self-service checkout terminal 400 and the gate reader 500 are connected to the fraud detection apparatus 10 via the network 50 so as to be able to communicate with each other.

In the following, another example of a purchase of commodity products made by performing self scanning will be described. FIG. 3 is a diagram illustrating another example of a purchase commodity products made by performing self scanning according to the first embodiment.

Figure 3:
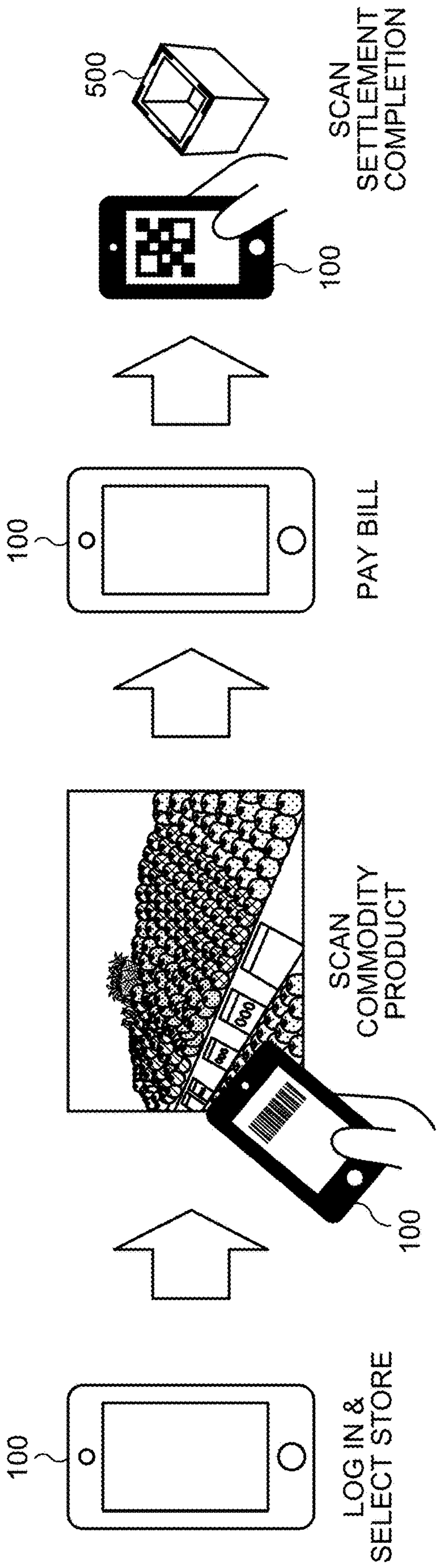
FIG. 3 is a diagram illustrating another example of the purchase of commodity products made by performing self scanning according to the first embodiment.

As illustrated in FIG. 3, first, a customer logs in via the application displayed on the user terminal 100 and selects the visited store. Then, the customer picks up commodity products to be purchased and reads, for example, a barcode of each of the commodity products to be purchased, a barcode attached to a commodity product shelf for each of the commodity products, or the like by using the user terminal 100. Furthermore, in also the case illustrated in FIG. 3, similarly to the case illustrated in FIG. 2, the commodity product scan may be performed at any location and any timing.

Then, the customer places a basket containing therein the commodity products to be purchased at a check point disposed inside the store, and pays a bill of the commodity products to be purchased by pressing an "payment button", a "purchase button", or the like displayed on the user terminal 100. Furthermore, the payment of the commodity products to be purchased is able to be performed by using electronic money, a credit card, or the like through the application displayed on the user terminal 100. Then, the customer is able to exit the store by causing the gate reader 500 or the like installed at the exit of the store or the like to read a settlement completion code displayed on the user terminal 100.

In the above, a purchase of commodity products made by performing self scanning has been described with reference to FIG. 2 and FIG. 3; however, in self scanning, a customer is able to perform a commodity product scan at any location. Accordingly, in self scanning, for example, a customer is able to put commodity products into a basket without performing a commodity product scan and is able to avoid a payment without passing through a self-service checkout counter. Alternatively, by scanning only some of the commodity products to be purchased and paying the bill of only the scanned commodity products at the self-service checkout counter, a customer is able to avoid a payment of the other commodity products. In particular, a fraudulent behavior tends to be easily found by a store clerk or the like in the case where the number of items of the commodity products is small; however, for example, it is difficult to find a fraudulent act by a store clerk or the like in the case where the number of items of the commodity products is large and some of the commodity products are not scanned.

Furthermore, in the case where a fraudulent act is detected, the following problem may further occur. For example, not all customers perform a commodity product scan by using the user terminal 100. That is, in some cases, some customers collectively pay a bill at a self-service checkout counter as in the past or some customers pay a bill assisted by a store clerk using a cash register. In other words, a person who has not performed commodity product scan is not always a person who exhibits a fraudulent act. Accordingly, for example, just detecting a person who has not performed a commodity product scan from a video image captured by the camera device 200 will result in detection of a customer who makes a payment at an ordinary cash register, so that it is difficult to accurately specify a person who exhibits a fraudulent act.

Figure 4:
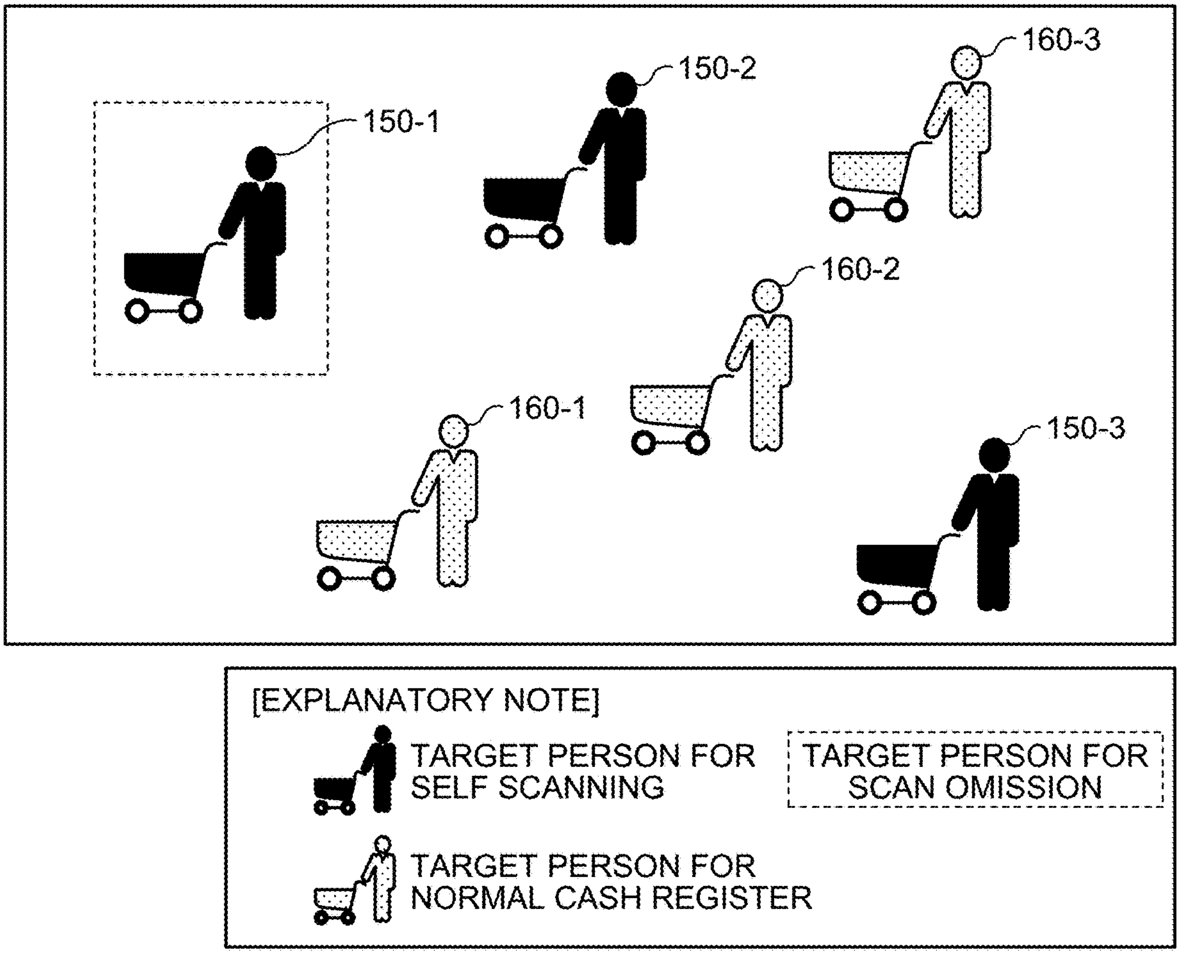
FIG. 4 is a diagram illustrating an example of scan omission detection obtained from a captured image according to the first embodiment.

FIG. 4 is a diagram illustrating an example of scan omission detection from a captured image according to the first embodiment. FIG. 4 is an example of an image of the inside of the store captured by the camera device 200. As illustrated in FIG. 4, target persons for self scanning 150-1 to 150-3 who make a purchase of commodity products by performing self scanning using their user terminals 100 and target persons for normal cash register 160-1 to 160-3 who make conventional purchase of commodity products without performing self scanning may be present inside the store.

For example, in the example illustrated in FIG. 4, it is assumed that only the target person for self scanning 150-1 is a target person for a scan omission who has not intentionally performed self scanning. Therefore, as illustrated in FIG. 4, detecting only the target person for self scanning 150-1 as a target person for a scan omission is the correct answer for the scan omission detection.

However, in the case where the fraud detection apparatus 10 determines that a person who does not made the motion of registering a commodity product to the user terminal 100 is a target person for a scan omission, the fraud detection apparatus 10 simply and erroneously detects the target person for normal cash register 160-1 to 160-3 who do not need to make this motion as target persons for the scan omission.

Furthermore, in the case where a person who has not performed a commodity product scan is detected from a video image obtained by the camera device 200, an amount of information transmitted to the fraud detection apparatus 10 or an amount of information to be processed is increased, so that a problem that the processing load will be increased may possibly occur. Thus, one of objects of the present embodiment is to solve this problem and to detect a scan omission caused by self scanning performed at the time of purchase of commodity products.

Functional Configuration of Fraud Detection Apparatus 10

Figure 5:
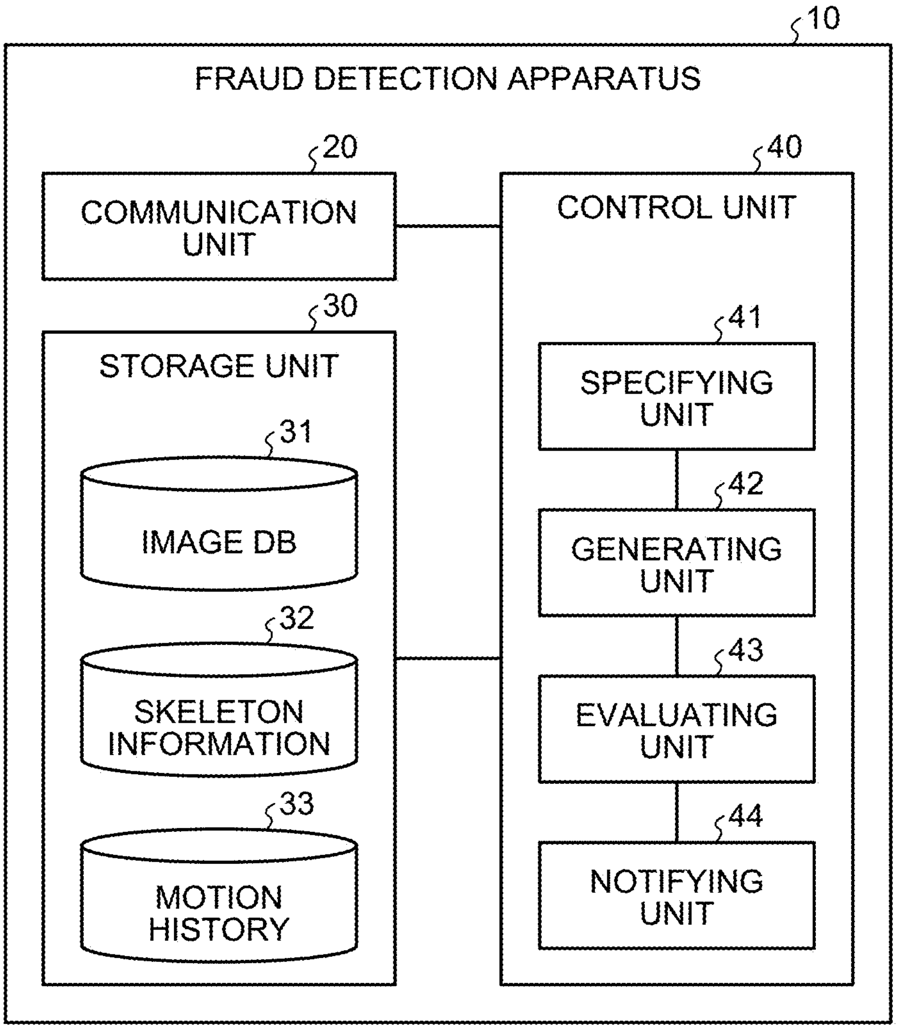
FIG. 5 is a configuration example of a fraud detection apparatus 10 according to the first embodiment.

In the following, a functional configuration of the fraud detection apparatus 10 will be described. FIG. 5 is a diagram illustrating a configuration example of the fraud detection apparatus 10 according to the first embodiment. As illustrated in FIG. 5, the fraud detection apparatus 10 includes a communication unit 20, a storage unit 30, and a control unit 40.

The communication unit 20 is a processing unit that controls communication with another device, such as the user terminal 100 or the camera device 200, and is, for example, a communication interface, such as a universal serial bus (USB) interface or a network interface card.

The storage unit 30 has a function for storing various kinds of data and a program executed by the control unit 40 and is implemented by, for example, a storage device, such as a memory or a hard disk. The storage unit 30 stores therein an image DB 31, skeleton information 32, the motion history 33, and the like. Furthermore, the DB is an abbreviation of a database.

The image DB 31 stores therein a plurality of captured images that are a series of frames captured by the camera device 200. Furthermore, the image DB 31 is able to store therein positional information on a person or an object that is included in an image and that is specified with respect to the subject captured image.

The skeleton information 32 stores therein skeleton information on the person specified from the captured image that is captured by the camera device 200. A process of generating the skeleton information will be described later.

The motion history 33 stores therein the number of motions of putting a commodity product into a basket or the number of motions of registering a commodity product into the user terminal 100 specified on the basis of skeleton information or the like. FIG. 6 is a diagram illustrating an example of data stored in the motion history 33 according to the first embodiment. As illustrated in FIG. 6, the motion history 33 stores therein, in an associated manner, "personal ID" that is an identifier for uniquely identifying a person, "put-into-basket motion count" that is the number of motions of putting a commodity product into a basket, and "commodity product registration motion count" that is the number of motions of registering a commodity product into the user terminal 100.

Furthermore, the above described information stored in the storage unit 30 is only an example, and the storage unit 30 is able to store various kinds of information other than the information described above.

The control unit 40 is a processing unit that manages the entirety of the fraud detection apparatus 10 and is, for example, a processor. The control unit 40 includes a specifying unit 41, a generating unit 42, an evaluating unit 43, and a notifying unit 44. Moreover, each of the processing units is an example of an electronic circuit included by the processor or an example of a process executed by the processor.

The specifying unit 41 specifies, from the captured image captured by the camera device 200, a person visiting a store and an object that is being used by the subject person. Moreover, a process of specifying the person may include a process of tracking, from the captured images that are captured at different time, the same person at different time on the basis of the appearance and an amount of movement of the person.

Furthermore, the specifying unit 41 specifies, on the basis of the specified object and the skeleton information that is generated by the generating unit 42, a first motion of a person putting a commodity product sold at a store into a basket and a second motion of the person registering the commodity product targeted for the purchase to the user terminal 100.

A process of specifying the first motion of putting a commodity product into a basket may include a process of specifying, on the basis of the specified object and the skeleton information, the first motion in the case where, for example, the fingers of the person have come out from the region of the specified basket after the fingers entered the region for a predetermined time period. Furthermore, a process of specifying the second motion of registering the commodity product targeted for the purchase may include a process of specifying, on the basis of the specified object and the skeleton information, the second motion in the case where both elbows of the person have not moved for a predetermined period of time while being bent forward within a predetermined range of the region of the specified basket.

The generating unit 42 generates skeleton information on the person specified by the specifying unit 41 from the captured image that is captured by the camera device 200.

The evaluating unit 43 counts a first count that is the number of the first motions of the person putting the commodity product sold at the store into the basket. Furthermore, the evaluating unit 43 counts a second count that is the number of the second motions of the person registering the commodity product targeted for the purchase to the user terminal 100. Furthermore, the evaluating unit 43 evaluates, on the basis of the first count and the second count, a behavior of the person exhibiting with respect to the purchase of a commodity product. Here, a process of evaluating the behavior may include a process of determining that the person has behaved fraudulently or performed an erroneous operation in the case where a difference between the first count and the second count is greater than or equal to the first threshold and in the case where the first count is greater than or equal to the second threshold.

Here, the state in which the difference between the first count and the second count is greater than or equal to the first threshold indicates that there is a comparatively large discrepancy between the number of motions of putting the commodity product into the basket and the number of motions of registering the commodity product. Accordingly, the evaluating unit 43 is able to determine that a scan omission of the commodity product occurs. Furthermore, the determination that the first count is greater than or equal to the second threshold is performed in order to determine whether or not the number of items of the commodity products that have been put into the basket is greater than or equal to a certain number. This is because, as described above, a fraudulent act performed in the case where the number of items of the commodity products is small is easily found by a store clerk but is difficult to be found by a store clerk or the like in the case where the number of items of the commodity products is large.

Furthermore, even when the difference between the first count and the second count is less than the first threshold, if a person has been specified from an image having captured therein a sales floor of a high-priced commodity product and if the difference is greater than or equal to a third threshold, a process of determining that the person has behaved fraudulently or performed an erroneous operation may be included. Here, the third threshold may be greater than zero and less than the first threshold. This determination is performed to more reliably detect a scan omission of the high-priced commodity product even when the discrepancy between the number of motions of putting the commodity product into the basket and the number of motions of registering the commodity product is small.

Furthermore, the process of counting the first count and the second count performed by the evaluating unit 43 and the process of evaluating a behavior may be performed in the case where the second motion is not specified after the first motion has been specified. Alternatively, each of the processes performed by the evaluating unit 43 may be performed at the time of calculation of a payment amount of the commodity products. Here, at the time of calculation of the payment amount of the commodity products mentioned here may be, for example, as illustrated in FIG. 2, at the time of a scan of a payment code displayed on a display unit, such as the self-service checkout terminal 400. Alternatively, at the time of calculation of a payment amount of the commodity products may be, for example, as illustrated in FIG. 3, at the time of payment of a bill of the purchased commodity products.

Furthermore, the evaluating unit 43 is able to check information on the commodity product targeted for a purchase registered by the first terminal against the specified second motion, and is able to associate the information with the second motion. As a result, it is possible to detect a scan omission of a commodity product in more detail. Furthermore, the information on the commodity product targeted for the purchase may be transmitted from the first terminal to the fraud detection apparatus 10 for, for example, each set of registered commodity product or transmitted at a predetermined timing. Furthermore, associating the information on the commodity product targeted for the purchase with the specified second motion may be performed by associating, for example, the time or the location, at which the information on the commodity product targeted for the purchase has been registered, that is matched with the time or the location, at which the second motion has been specified, with an item originated from a motion made by the same person.

If it is determined that a person has behaved fraudulently or performed an erroneous operation on the basis of the evaluation of a behavior obtained by the evaluating unit 43, the notifying unit 44 notifies the store clerk terminal 300 of an alert. Furthermore, the notification of the alert may be an output of a message, a sound, or the like. In addition, the notifying unit 44 is able to transmit, together with the notification of the alert, information for specifying a person who has behaved fraudulently or performed an erroneous operation, such as a captured image of, for example, the captured person who has behaved fraudulently or performed an erroneous operation, to the store clerk terminal 300. Furthermore, in the case where a plurality of persons are captured in the captured image, the notifying unit 44 may process the captured image by, for example, surrounding the person who has behaved fraudulently or performed an erroneous operation with a frame such that the person who has behaved fraudulently or performed an erroneous operation is easily specified.

Details of Functions

Figure 7:
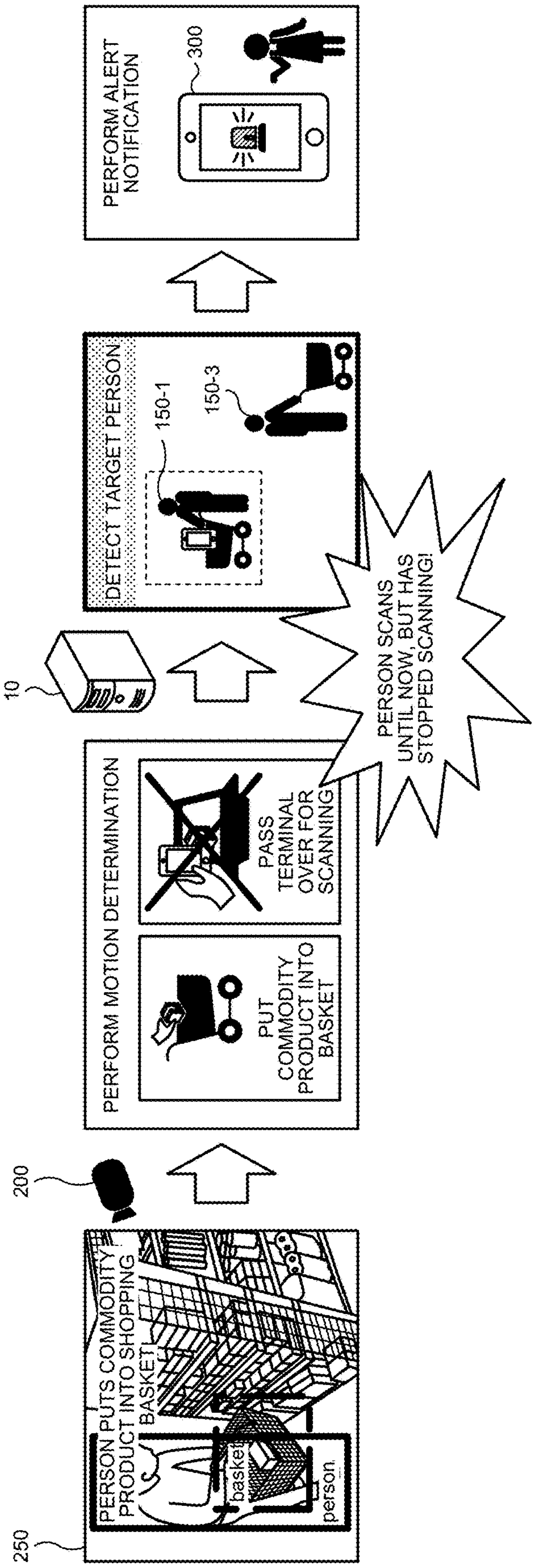
FIG. 7 is a diagram illustrating an example of a scan omission detection process according to the first embodiment.

In the following, a scan omission detection process according to the first embodiment performed by the fraud detection apparatus 10 functioning as an actor will be described with reference to FIGS. 7 to 9. FIG. 7 is a diagram illustrating an example of a scan omission detection process according to the first embodiment. A captured image 250 illustrated in FIG. 7 is an example of a captured image having captured therein the inside of a store of a retail store captured by the camera device 200. The fraud detection apparatus 10 specifies a person or an object from the captured image 250. Specifying an object from the captured image 250 will be described with reference to FIG. 8.

Figure 8:
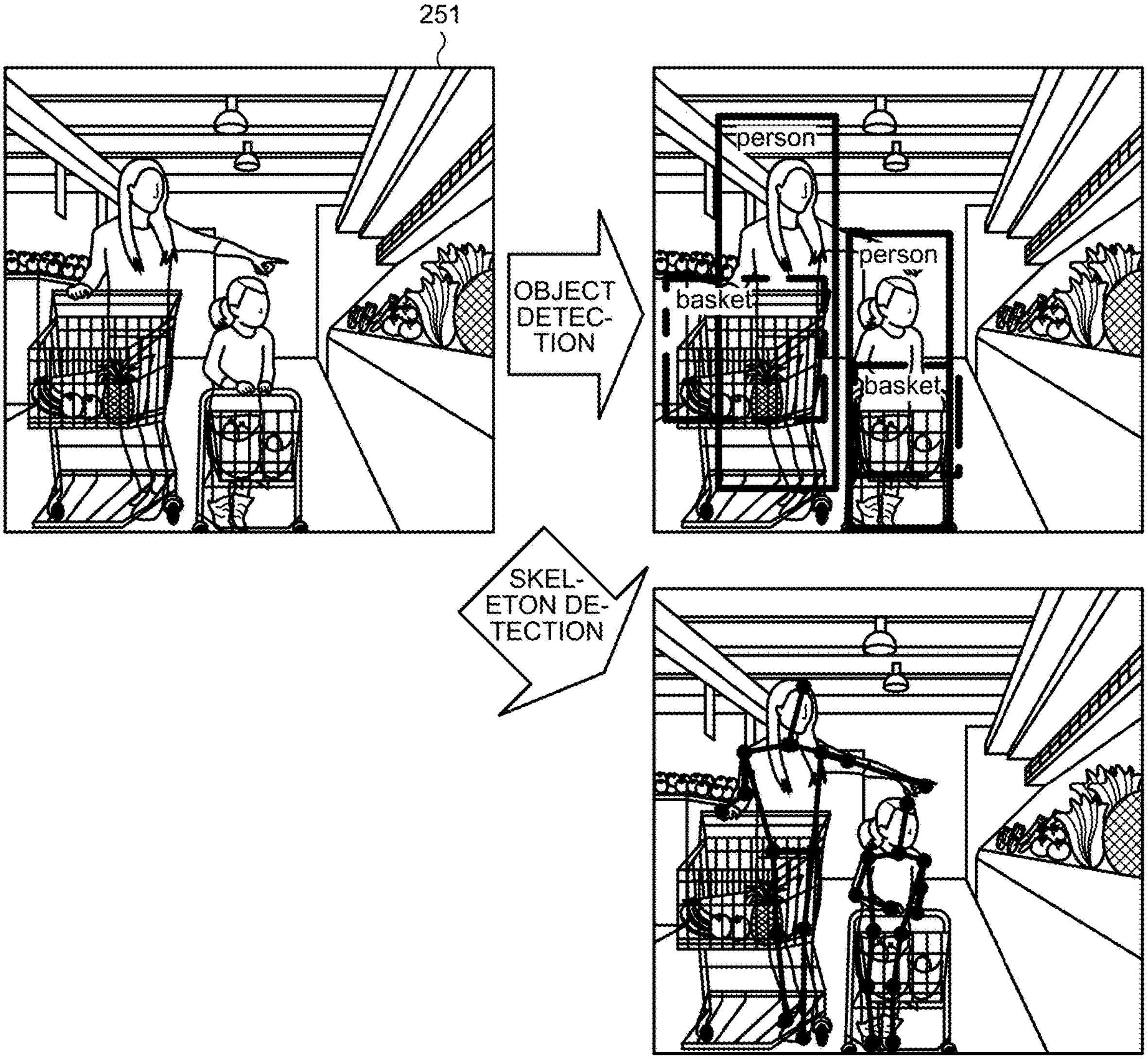
FIG. 8 is a diagram illustrating an example of object detection and skeleton detection according to the first embodiment.

FIG. 8 is a diagram illustrating an example of object detection and skeleton detection according to the first embodiment. As illustrated on the upper right part of FIG. 8, the fraud detection apparatus 10 detects and specifies persons and baskets from a captured image 251 by using, for example, an existing object detection algorithm. The existing object detection algorithm mentioned here is, for example, an object detection algorithm using deep training, such as Faster Convolutional Neural Network (R-CNN). Furthermore, the existing object detection algorithm may be an object detection algorithm, such as You Only Look Once (YOLO) or Single Shot Multibox Detector (SSD).

Furthermore, other than the persons or the baskets, for example, commodity products, the user terminal 100, or clothes of a person may be detected from the captured image. As a result, the fraud detection apparatus 10 is able to detect a state in which, for example, a person does not perform self scanning even though the person has the user terminal 100. Furthermore, the fraud detection apparatus 10 is able to exclude, for example, a person who wears a uniform of a store clerk from the target of the scan omission detection process.

Furthermore, the fraud detection apparatus 10 is able to determine an age of the person specified from the captured image by using, for example, an existing algorithm, and specify a group relationship, such as a parent and child relationship, between the persons. As a result, for example, in a case of the parent and child relationship, it may be determined that a scan omission of a commodity product does not occur as long as a commodity product scan is performed on one of the targeted persons.

Furthermore, as illustrated on the lower right part of FIG. 8, the fraud detection apparatus 10 detects skeletons of persons specified by the captured image 250 by using, for example, existing pose estimation and an existing skeleton estimation algorithm. The existing pose estimation and the existing skeleton estimation algorithm mentioned here are a pose estimation algorithm using deep training, such as DeepPose or OpenPose, or a skeleton estimation algorithm using deep training, such as Human Pose estimation. Then, the fraud detection apparatus 10 specifies the motion of the person on the basis of the detected skeleton information.

Figure 9:
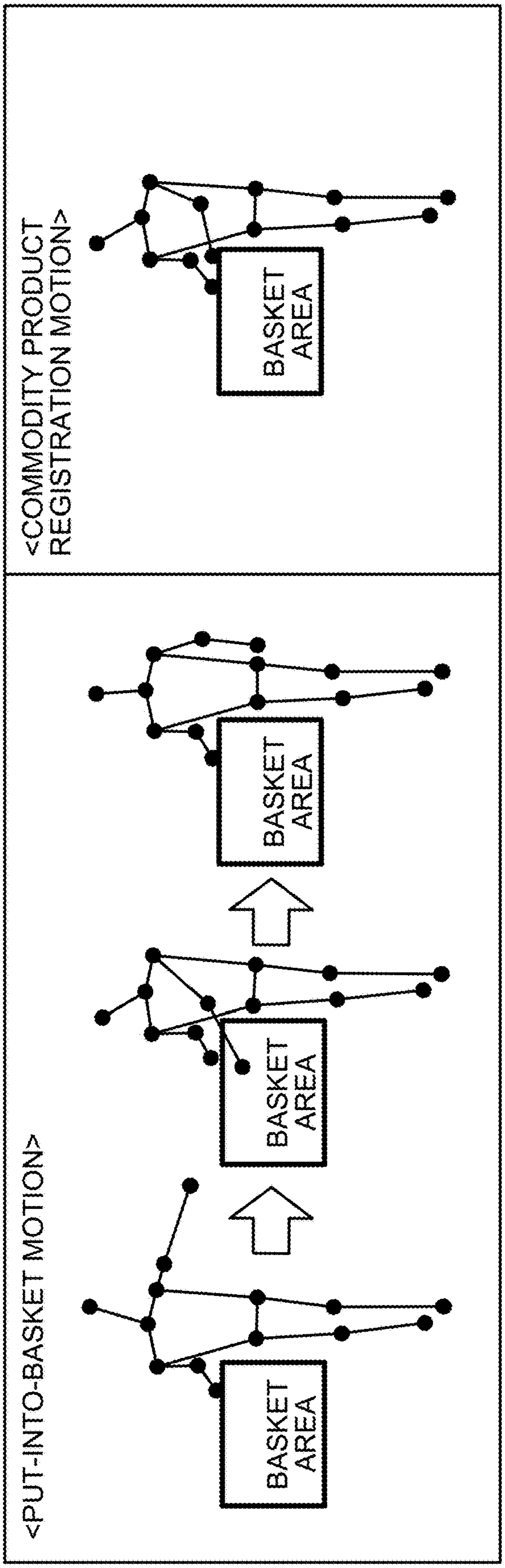
FIG. 9 is a diagram illustrating an example of specifying a motion according to the first embodiment.

FIG. 9 is a diagram illustrating an example of specifying a motion according to the first embodiment. As illustrated on the left side of FIG. 9, the fraud detection apparatus 10 specifies a motion of a person putting a commodity product into a basket in the case where, for example, the skeleton of the fingers of the person has come out from the region of the basket after the fingers entered the region of the basket for a predetermined period of time. Here, the motions made during the predetermined time period can be determined from consecutive motions that are specified from each of the captured images that are consecutively captured. Furthermore, the fraud detection apparatus 10 is able to determine a movement of each of the commodity products and a movement of the skeleton of the fingers specified from, for example, the captured image and is able to specify a more detailed motion, for example, is able to specify which one of the commodity products is put into the basket.

Furthermore, as illustrated on the right side of FIG. 9, the fraud detection apparatus 10 specifies a motion of a person registering a commodity product targeted for a purchase to the user terminal 100 in the case where, for example, the both elbows of the person have not moved for a predetermined time period while being bent forward within a predetermined range of a the region of the specified basket. Furthermore, the fraud detection apparatus 10 is able to detect, for example, a surface of a barcode of each of the commodity products and specify a more detailed motion, such as a motion indicating which commodity product has been registered.

Furthermore, when the fraud detection apparatus 10 specifies each of the motions, it is possible to reduce a processing load by generating and processing the skeleton information having a smaller amount of information from the captured images, instead of directly processing the captured image.

A description will be given here by referring back to FIG. 7. The fraud detection apparatus 10 specifies a person or an object from the captured image 250, and specifies a motion of the specified person putting the commodity product into the basket and a motion of registering the commodity product. Then, the fraud detection apparatus 10 is able to detect, as a target person for a scan omission, a person who no longer performs any commodity product scan even though a person has performed a commodity product scan and registered the commodity product by using the user terminal 100 with respect to, for example, a motion of putting a commodity product into the basket. Furthermore, the fraud detection apparatus 10 is able to additionally perform a process on the captured image 250 by, for example, enclosing a target person for self scanning 150-1 who is a target person for a scan omission with a frame such that the target person for a scan omission is easily specified. Then, the fraud detection apparatus 10 notifies the store clerk terminal 300 of the captured image 250 from which the target person for a scan omission is easily specified and information indicating that a scan omission has been detected as an alert.

Flow of Process

Figure 10:
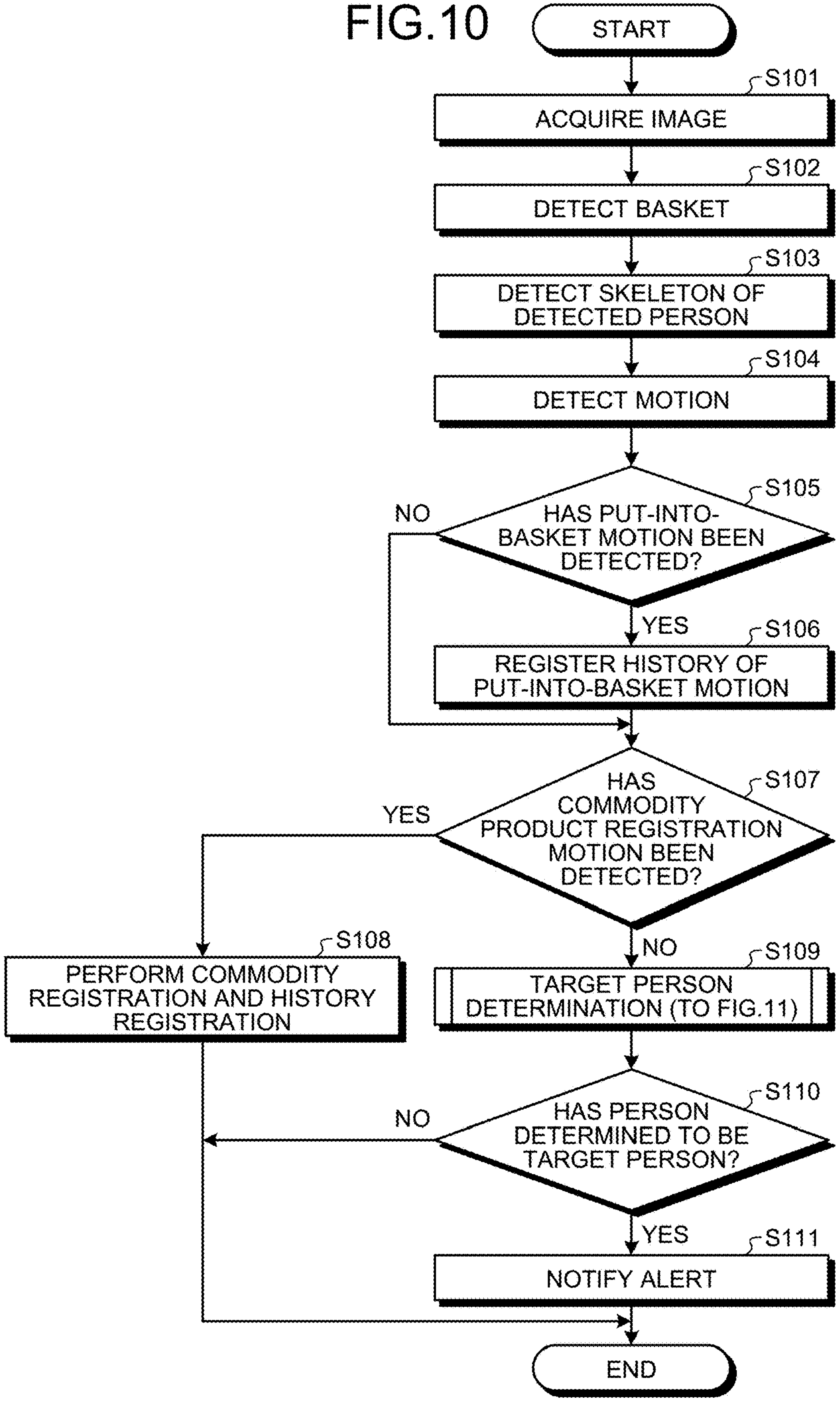
FIG. 10 is a flowchart illustrating the flow of the scan omission detection process according to the first embodiment.

In the following, the flow of a scan omission detection process performed by the fraud detection apparatus 10 will be described. FIG. 10 is a flowchart illustrating the flow of the scan omission detection process according to the first embodiment. The scan omission detection process illustrated in FIG. 10 may be performed, for example, at fixed intervals, or every time a captured image is received from the camera device 200.

First, as illustrated in FIG. 10, the fraud detection apparatus 10 acquires, from the image DB 31, a captured image of a predetermined image capturing range, such as the inside or the site of the store of the retail store, captured by the camera device 200 (Step S101). Furthermore, in the scan omission detection process illustrated in FIG. 10, in order to process the captured image captured by the camera device 200, in a precise sense, a monitoring video image in real time, the captured image is transmitted from the camera device 200 as needed, and is stored in the image DB 31.

Then, the fraud detection apparatus 10 detects, by using the existing object detection algorithm, a shopping basket from the captured image acquired at Step S101 (Step S102).

Then, the fraud detection apparatus 10 detects, by using the existing object detection algorithm, a person from the captured image acquired at Step S101, and furthermore, detects the skeleton of the detected person by using the existing pose estimation and skeleton estimation algorithms (Step S103). Furthermore, the order of the processes performed at Steps S102 and S103 may be performed in reverse order, or the processes at Steps S102 and S103 may be performed in parallel.

Then, the fraud detection apparatus 10 detects the motion of the person on the basis of the basket detected at Step S102 and the skeleton detected at Step S103 (Step S104). The motion detected at Step S104 is the motion of the person putting the commodity product into the basket and the motion of the person scanning and registering the commodity product targeted for the purchase to the user terminal 100.

Furthermore, the motion of putting the commodity product into the basket is specified in the case where, for example, the skeleton of the fingers of the person has come out from the region of the basket after the fingers entered the region for a predetermined period of time. The motion of registering the commodity is specified in the case where, for example, both elbows of the person have not moved for a predetermined period of time while being bent forward within a predetermined range of the region of the basket. Furthermore, in order to specify the motion of the person, the captured images that are consecutively captured and the basket and the skeleton information that are detected from these captured images are needed. Accordingly, at the time of process performed at Step S104, the processes at Steps S101 to S103 may be repeatedly performed a predetermined number of times by using different captured images.

If the put-into-basket motion has been detected at the motion detection at Step S104 (Yes at Step S105), the fraud detection apparatus 10 registers the put-into-basket motion to the motion history 33 (Step S106). This indicates that, for example, a put-into-basket motion count Nk stored in the motion history 33 is incremented by one.

In contrast, if the put-into-basket motion is not detected (No at Step S105), or after having registered the put-into-basket motion (Step S106), the process at Step S107 is performed. As a result, if a commodity product registration motion has been detected at the motion detection performed at Step S104 (Yes at Step S107), the fraud detection apparatus 10 registers the commodity product registration motion to the motion history 33 (Step S108). This indicates that, for example, a commodity product registration motion count Ns stored in the motion history 33 is incremented by one. After having performed the process at Step S108, the scan omission detection process illustrated in FIG. 10 is ended.

In contrast, if the commodity product registration motion is not detected (No at Step S107), the fraud detection apparatus 10 performs a target person determination process that will be described later by using FIG. 11 (Step S109). If it is determined, on the basis of the target person determination process performed at Step S109, that the person for which no commodity product registration motion has been detected at Step S107 is a target person for a scan omission (Yes at Step S110), the fraud detection apparatus 10 notifies the store clerk terminal 300 of an alert (Step S111). If it is determined that the person for which no commodity product registration motion has been detected after having performed the process at Step S111 or at the process at Step S107 is not a target person for a scan omission (No at Step S110), the scan omission detection process illustrated in FIG. 10 is ended.

In the following, the target person determination process performed at Step S109 illustrated in FIG. 10 will be described. FIG. 11 is a flowchart illustrating the flow of the target person determination process according to the first embodiment.

Figure 11:
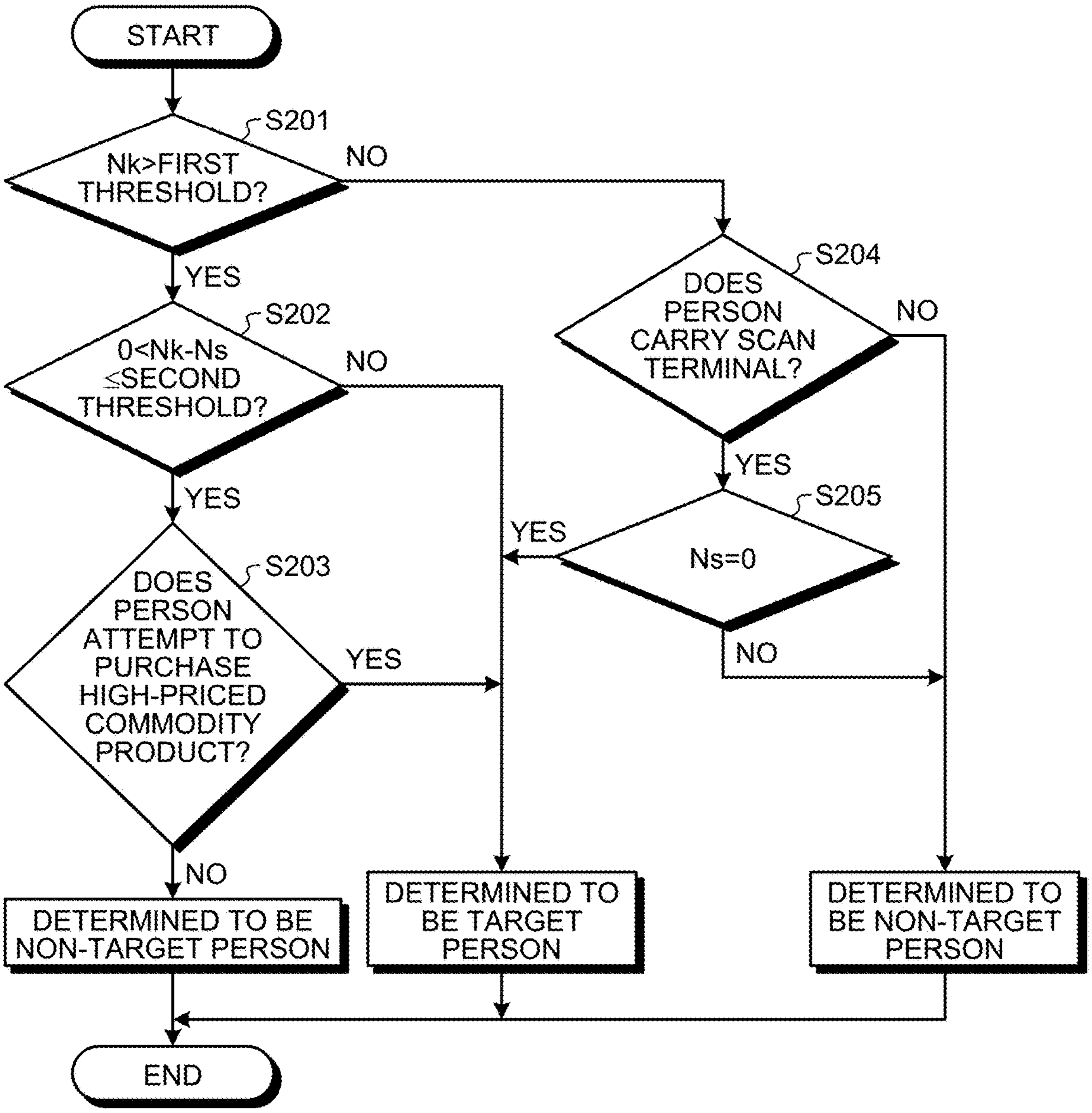
FIG. 11 is a flowchart illustrating the flow of a target person determination process according to the first embodiment.

First, as illustrated in FIG. 11, the fraud detection apparatus 10 determines whether or not the put-into-basket motion count Nk of the person targeted for the determination is greater than a first threshold (Step S201). The determination is, as described above, a determination of whether or not the number of items of the commodity products that have been put into the basket is greater than or equal to a certain number.

If the put-into-basket motion count Nk is greater than the first threshold (Yes at Step S201), the fraud detection apparatus 10 determines whether or not a difference between the put-into-basket motion count Nk and the commodity product registration motion count Ns is greater than zero and is equal to or less than the second threshold (Step S202). The determination is, as described above, a determination of whether or not a difference between the number of motions of putting the commodity product into the basket and the number of motions of registering the commodity product is greater than the second threshold and whether or not there is a comparatively large discrepancy.

If the difference between the put-into-basket motion count Nk and the commodity product registration motion count Ns is greater than the second threshold (No at Step S202), the fraud detection apparatus 10 determines that the person targeted for the determination is a target person for a scan omission.

In contrast, if the difference between the put-into-basket motion count Nk and the commodity product registration motion count Ns is less than or equal to the second threshold (Yes at Step S202), the fraud detection apparatus 10 determines whether or not the person targeted for the determination attempts to purchase a high-priced commodity product (Step S203). Regarding this determination, for example, in the case where the person targeted for the determination has been detected from an image having captured therein a sales floor of the high-priced commodity product or in the case where a motion of putting the high-priced commodity product into a basket, it is determined that the person targeted for the determination attempts to purchase the high-priced commodity product.

If the person targeted for the determination does not attempt to purchase the high-priced commodity product (No at Step S203), the fraud detection apparatus 10 determines that the person targeted for the determination is a non-target person for a scan omission.

In contrast, if the person targeted for the determination attempts to purchase the high-priced commodity product (Yes at Step S203), the fraud detection apparatus 10 determines that the person targeted for the determination is a target person for a scan omission.

Furthermore, if the put-into-basket motion count Nk is less than or equal to the first threshold (No at Step S201), the fraud detection apparatus 10 determines whether or not the person targeted for the determination carries a scan terminal, i.e., the user terminal 100 (Step S204). This determination may be determined in accordance with whether or not the user terminal 100 has been detected from the captured image by using, for example, the existing object detection algorithm.

If the person targeted for the determination does not carry the user terminal 100 (No at Step S204), the fraud detection apparatus 10 determines that the person targeted for the determination is a non-target person for a scan omission.

In contrast, if the person targeted for the determination carries the user terminal 100 (Yes at Step S204), the fraud detection apparatus 10 determines whether or not the commodity product registration motion count Ns is zero (Step S205). If the commodity product registration motion count Ns is zero (Yes at Step S205), the fraud detection apparatus 10 determines that the person targeted for the determination is a target person for a scan omission. The reason is that, even if the number of items of the commodity products that are put into the basket is small, if registration of the commodity products is not performed at all, this state is detected as a scan omission of the commodity products.

In contrast, if the commodity product registration motion count Ns is not zero (No at Step S205), the fraud detection apparatus 10 determines that the person targeted for the determination is a non-target person for a scan omission. The reason is that, because the number of items of the commodity products that are put into the basket is small, it is determined that the discrepancy is small even if there is a difference between the number of motions of putting a commodity product into the basket and the number of motions of registering the commodity product as long as registration of the commodity products has been performed, and this state is not detected as a scan omission. In this case, if the number of items of the commodity products that are put into the basket is increased on the basis of a future behavior of the person targeted for the determination, this state is stopped at Step S202, and it may possibly be determined that the person targeted for the determination is a target person for a scan omission.

[b] Second Embodiment

However, in some cases, a motion of scanning and registering a commodity product to the user terminal 100, that is, a commodity product registration motion, is performed outside the image capturing range of the camera device 200. For example, this case may occur in the case where a person collectively scans commodity products after moving to an unoccupied location that is outside the image capturing range of the camera device 200 due to congestion of a sales floor on which the camera device 200 is installed. In this case, the commodity product registration motion is not reflected in a video image captured by the camera device 200, and it is thus not possible to detect the commodity product registration motion, so that the commodity product registration motion count corresponding to that amount is not counted. Accordingly, there may be some cases where a person who collectively performs commodity product scans is erroneously determined to be a target person for scan omission. To solve this type of problem, it is conceivable to increase the number of the camera devices 200; however, this may possibly result in an increase in cost.

Thus, as a second embodiment, in a determination process for determining a target person for scan omission, the number of scanned registration entries is used instead of the commodity product registration motion count. The number of scanned registration entries is the number of commodity products that are scanned by the customer by himself or herself by using the user terminal 100 and that are registered, as the commodity products to be purchased, to the user terminal 100 or the self-service checkout terminal 400. Furthermore, the determination process of a target person for a scan omission described in the first embodiment and the second embodiment may be used in combination.

Figure 13:
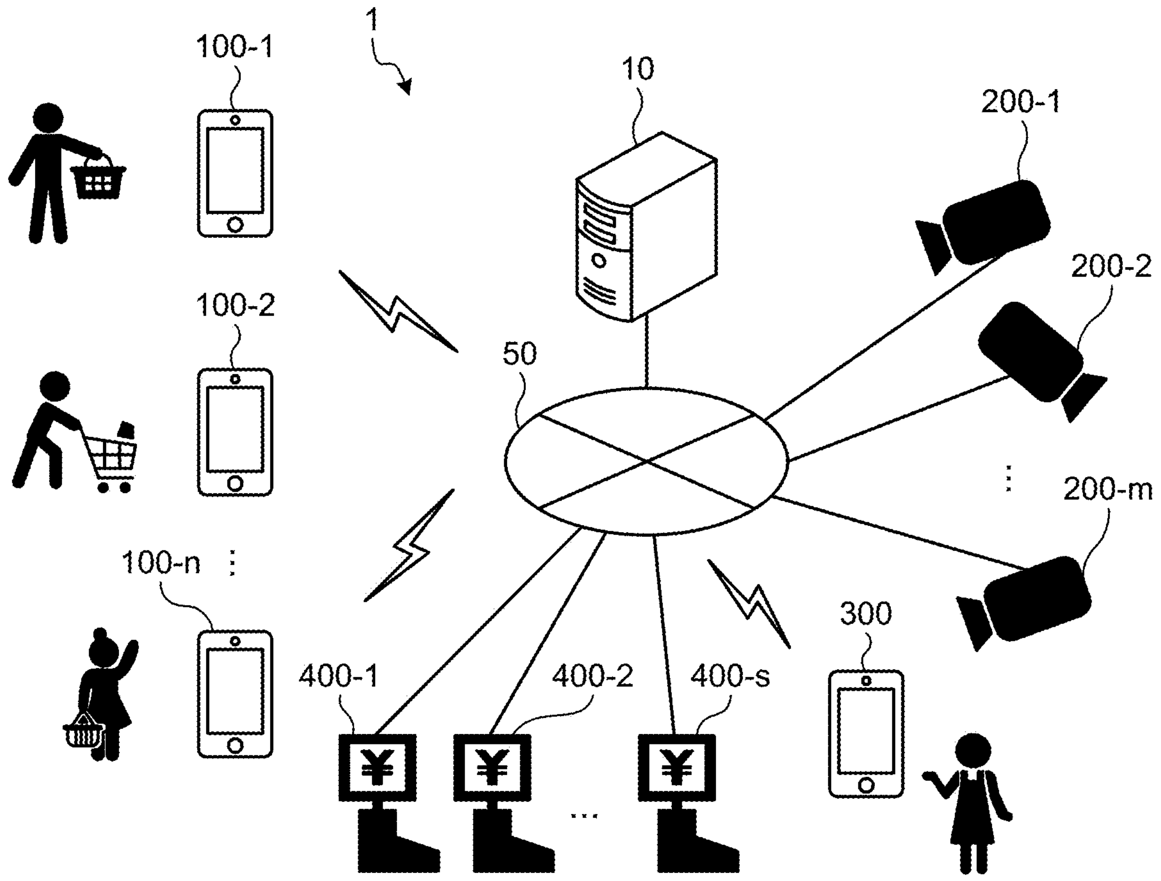
FIG. 13 is a diagram illustrating a configuration example of a fraud detection system 2 according to a second embodiment.

FIG. 13 is a diagram illustrating a configuration example of the fraud detection system 2 according to the second embodiment. As illustrated in FIG. 13, the fraud detection system 2 is a system in which the fraud detection apparatus 10 is connected to the user terminals 100, the camera devices 200, and the store clerk terminal 300 via the network 50 so as to be communicated with each other. Furthermore, in the fraud detection system 2, the fraud detection apparatus 10 is also connected to self-service checkout terminals 400-1 to 400-*s* (s is any integer. Hereinafter, collectively referred to as a "self-service checkout terminal 400") via the network 50 so as to be communicated with each other.

The fraud detection apparatus 10, the network 50, the user terminals 100, the camera devices 200, and the store clerk terminal 300 included in the fraud detection system 2 are the same as those included in the fraud detection system 1 illustrated in FIG. 1.

The self-service checkout terminal 400 is a terminal that is used by a customer by himself or herself to pay a bill of the commodity product. The self-service checkout terminal 400 receives information on the commodity products to be purchased via the user terminal 100 at the time of calculation of a payment amount of the commodity products. Then, the self-service checkout terminal 400 accepts, from the customer, the payment of the commodity products to be purchased made by cash, a credit card, electronic money, or the like.

Figure 14:
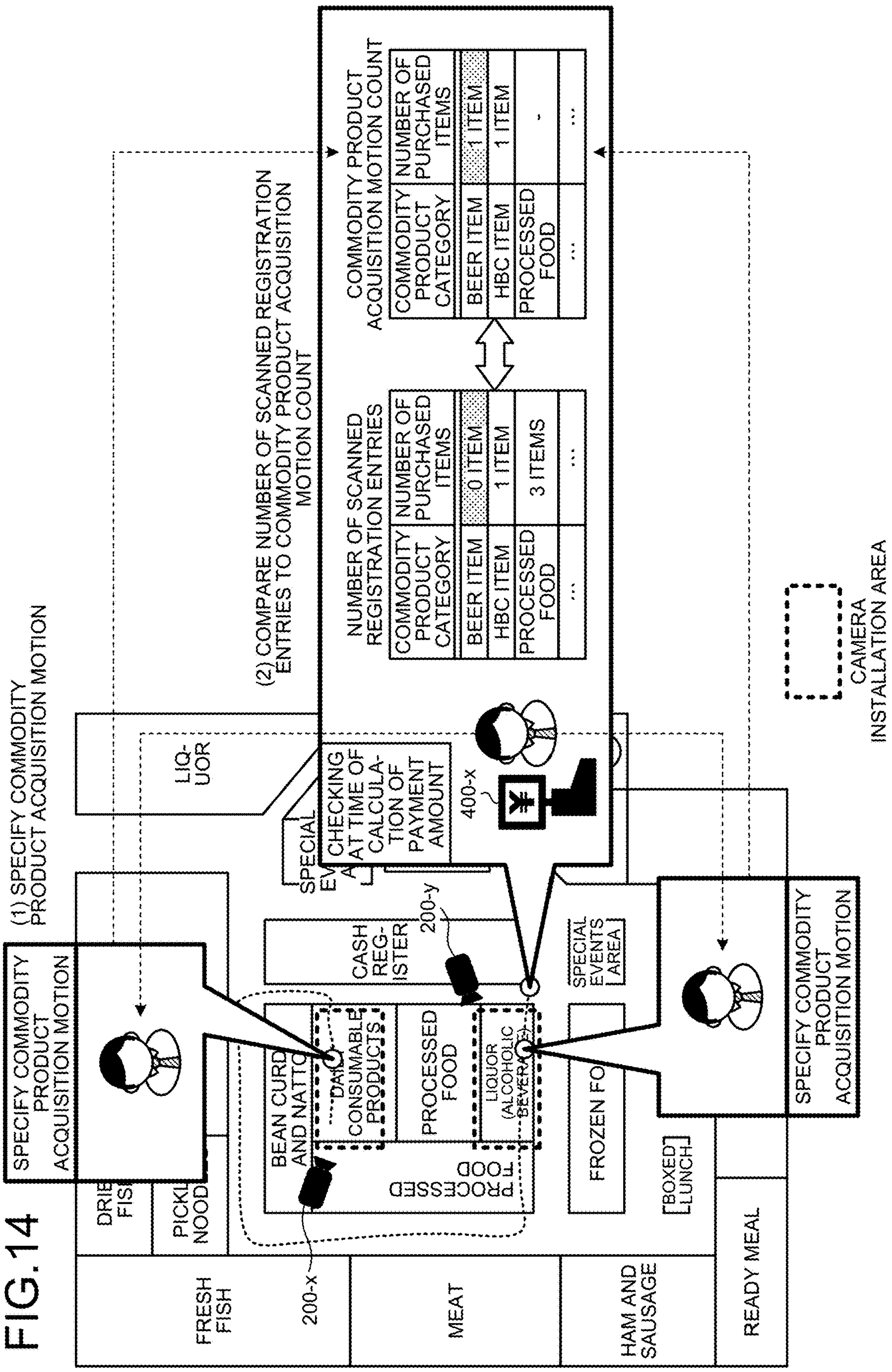
FIG. 14 is a diagram illustrating an example of scan omission detection according to the second embodiment.

FIG. 14 is a diagram illustrating an example of scan omission detection according to the second embodiment. As illustrated in FIG. 14, the fraud detection apparatus 10 used in the fraud detection system 2 specifies, from the captured images of each of the sales floors captured by the camera devices 200, the first motion of a person who is visiting the store acquiring a commodity product sold in the store, and counts the number of motions thereof as a commodity product acquisition motion count. The example illustrated in FIG. 14 indicates the state in which a motion of acquiring a commodity product of a HBC item is counted one time from the captured image of the sales floor of daily consumable products captured by a camera device 200-*x*, and a motion of acquiring a commodity product of a beer item is counted one time from the captured image of a liquor sales floor captured by a camera device 200-*y*.

Furthermore, the fraud detection apparatus 10 counts, as the number of scanned registration entries, the second count that indicates the number of times a commodity product targeted for a purchase has been registered to the first terminal by a person. Here, the first terminal corresponds to the user terminal 100 or the self-service checkout terminal 400. The example illustrated in FIG. 14 indicates the state in which the number of commodity products that are registered by the person by scanning the respective bar codes or the respective QR codes (registered trademark) attached to the commodity products via the user terminal 100 is transmitted to and displayed on a self-service checkout terminal 400-*x* at the time of calculation of a payment amount of the commodity products.

Then, the fraud detection apparatus 10 checks the commodity product acquisition motion count that is the first count of the specified first motion against the number of scanned registration entries that is the counted second count, and evaluates, on the basis of the checking result, the behavior of the person exhibiting with respect to a purchase of the commodity product. More specifically, for example, if a difference between the commodity product acquisition motion count and the number of scanned registration entries is greater than or equal to a first threshold and if the commodity product acquisition motion count is greater than or equal to a second threshold, the fraud detection apparatus 10 determines that the target person has behaved fraudulently or performed an erroneous operation. In the example illustrated in FIG. 14, the commodity product acquisition motion count of the beer item is one time, whereas the number of scanned registration entries is zero, so that the fraud detection apparatus 10 is able to determine that the target person has behaved fraudulently or performed an erroneous operation.

Functional Configuration of Fraud Detection Apparatus 10

Figure 15:
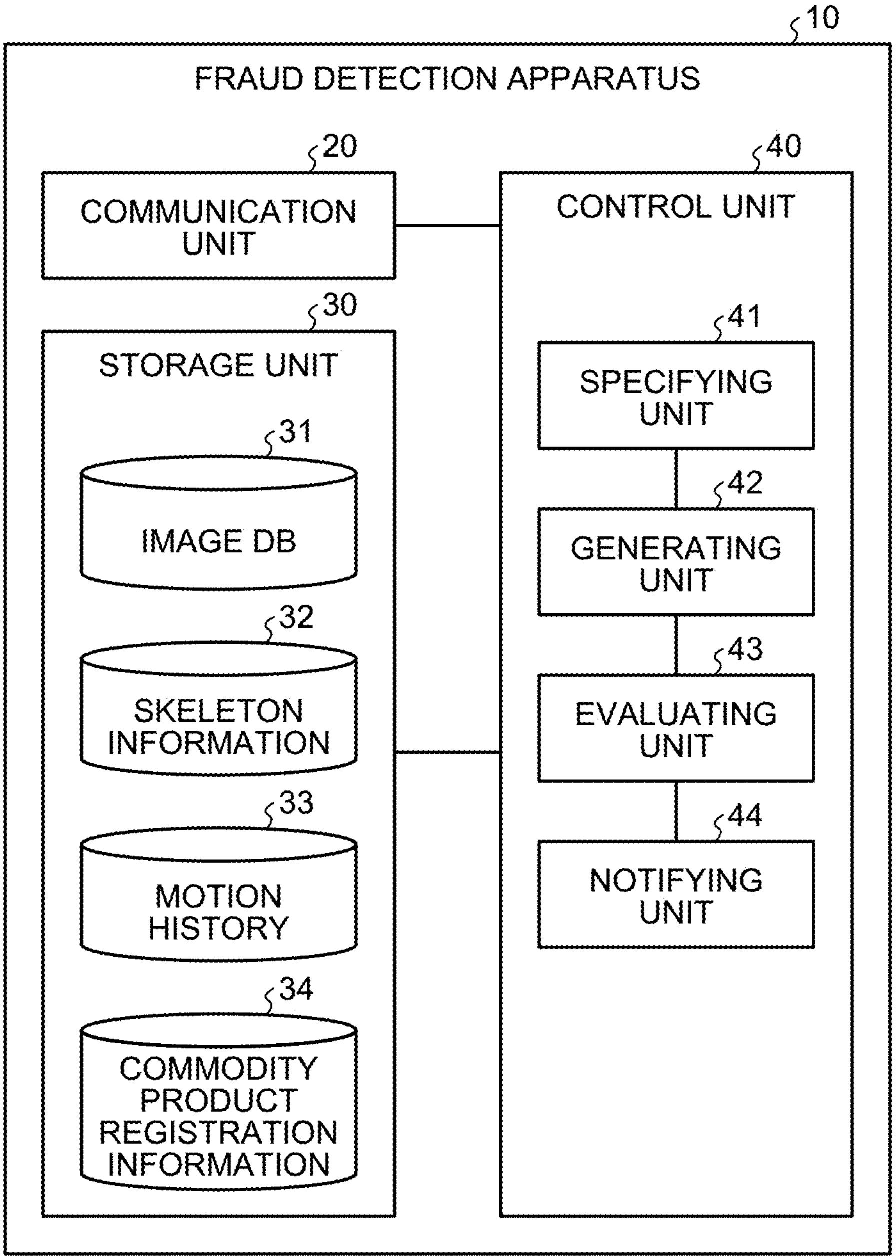
FIG. 15 is a diagram illustrating a configuration example of the fraud detection apparatus 10 according to the second embodiment.

In the following, a functional configuration of the fraud detection apparatus 10 will be described. FIG. 15 is a diagram illustrating a configuration example of the fraud detection apparatus 10 according to the second embodiment. As illustrated in FIG. 15, the fraud detection apparatus 10 includes the communication unit 20, the storage unit 30, and the control unit 40.

Similarly to the fraud detection apparatus 10 according to the first embodiment, the communication unit 20 is a processing unit that controls communication with another device, such as the user terminal 100, the camera device 200, the store clerk terminal 300, or the self-service checkout terminal 400.

Similarly to the fraud detection apparatus 10 according to the first embodiment, the storage unit 30 has a function for storing various kinds of data and the program executed by the control unit 40 and is implemented by, for example, a storage device, such as a memory or a hard disk. The storage unit 30 stores therein the image DB 31, the skeleton information 32, the motion history 33, the commodity product registration information 34, and the like.

Similarly to the fraud detection apparatus 10 according to the first embodiment, the image DB 31 is able to store therein a plurality of captured images that are a series of frames captured by the camera device 200 and is able to store therein position information on a person or an object that is included in an image and that is specified with respect to the subject captured image.

Similarly to the fraud detection apparatus 10 according to the first embodiment, the skeleton information 32 stores therein skeleton information on the person specified from the captured image that is captured by the camera device 200.

The motion history 33 stores therein the number of motions of a person specified on the basis of the skeleton information or the like. FIG. 16 is an example of data stored in the motion history 33 according to the second embodiment. As illustrated in FIG. 16, the motion history 33 stores therein, in an associated manner, for example, "person ID" that is an identifier for uniquely identifying a person who has performed a motion, "time" that is the time at which the motion has been specified by the fraud detection apparatus 10, "motion" that indicates the type of the specified motion, and "commodity product category" that indicates a commodity product item of the acquired commodity product. Here, for example, the "commodity product acquisition" indicated by the "motion" illustrated in FIG. 16 may be set in the case where the motion of the target person acquiring a commodity product from a sales floor has been specified, and the "commodity product return" may be set in the case where the motion of the target person returning the commodity product to the sales floor. Furthermore, although not illustrated, the motion history 33 may store feature information on the person extracted from the captured image. Furthermore, the feature information on the person may be, for example, an image feature of the body of a person, such as clothes, an image feature amount obtained by using Re-Identification (Re-ID), an image feature obtained by specifying the position of the body of the person after performing skeleton estimation, or the like.

The commodity product registration information 34 stores therein the number of commodity products that have been registered as the commodity products to be purchased after the customer scanned the commodity products by himself or herself by using the user terminal 100. As illustrated in FIG. 17, the commodity product registration information 34 stores therein, in an associated manner, "person ID" that is an identifier for uniquely identifying a person who has scanned a commodity product and registered the commodity product, "the number of entries" that indicates the number of entries of the commodity products scanned and registered, and "commodity product category" that indicates the commodity product item of the scanned commodity products.

Furthermore, the above described information stored in the storage unit 30 is only an example, and the storage unit 30 is able to store various kinds of information other than the information described above.

Similarly to the fraud detection apparatus 10 according to the first embodiment, the control unit 40 is a processing unit that manages the entirety of the fraud detection apparatus 10. The control unit 40 includes the specifying unit 41, the generating unit 42, the evaluating unit 43, and the notifying unit 44.

Similarly to the fraud detection apparatus 10 according to the first embodiment, the specifying unit 41 specifies, from the captured image captured by the camera device 200, a person visiting a store and an object, such as, a commodity product or a basket, that is being used by the subject person. Furthermore, on the basis of the specified object, the skeleton information generated by the generating unit 42, or the like, the specifying unit 41 specifies the first motion of a person acquiring a commodity product or specifies a motion of a person returning the commodity product to the sales floor. Furthermore, a process of specifying the motion of the person acquiring the commodity product may be a process of specifying a motion of a person acquiring a commodity product from a commodity product shelf, or may be a process of specifying a motion of a person taking out a commodity product from a basket. Similarly, the process of specifying the motion of a person returning the commodity product to the sales floor may be a process of specifying a motion of a person returning the commodity product shelf to the commodity product, or may be a process of specifying a motion of a person putting a commodity product into a basket.

Similarly to the fraud detection apparatus 10 according to the first embodiment, the generating unit 42 generates skeleton information on the person specified by the specifying unit 41 from the captured image that has been captured by the camera device 200.

The evaluating unit 43 counts the first count of the first motion of a person acquiring a commodity product. Furthermore, the evaluating unit 43 counts the second count that indicates the number of times the commodity product targeted for a purchase has been registered, by a person, to the first terminal that is the user terminal 100 or the self-service checkout terminal 400. Then, the evaluating unit 43 evaluates, on the basis of the first count and the second count, a behavior of the person exhibiting with respect to the purchase of the commodity product. Here, a process of evaluating the behavior may include a process of determining that the person has behaved fraudulently or performed an erroneous operation in the case where a difference between the first count and the second count is greater than or equal to the first threshold, and the first count is greater than or equal to the second threshold.

Furthermore, a process of counting the first count and the second count performed by the evaluating unit 43 and the process of evaluating the behavior may be performed in the case where the second motion of the person registering commodity product targeted for a purchase to the first terminal is not specified after the first motion has been specified. Here, the first terminal is the user terminal 100 or the self-service checkout terminal 400.

Similarly to the fraud detection apparatus 10 according to the first embodiment, if it is determined, by the evaluation of the behavior obtained by the evaluating unit 43, that the person has behaved fraudulently or performed an erroneous operation, the notifying unit 44 notifies the store clerk terminal 300 of an alert.

Figure 18:
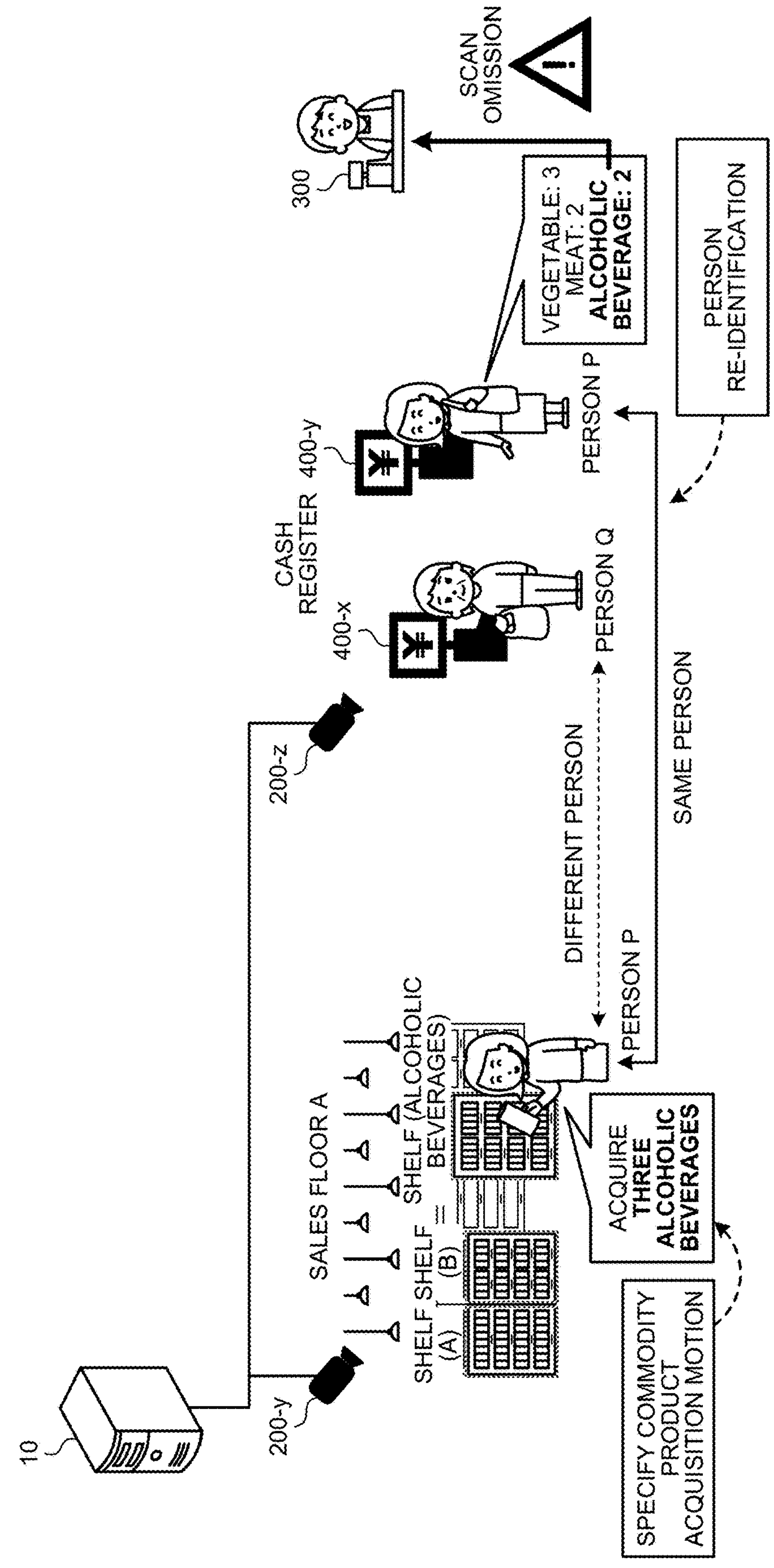
FIG. 18 is a diagram illustrating an example of scan omission detection according to the second embodiment.

In the following, a scan omission detection process according to the second embodiment performed by the fraud detection apparatus 10 functioning as an actor will be described in detail with reference to FIG. 18. FIG. 18 is a diagram illustrating an example of scan omission detection according to the second embodiment.

As illustrated in FIG. 18, the fraud detection apparatus 10 specifies, from the captured image of a sales floor A captured by the camera device 200-*y*, a motion of a person P acquiring a commodity product from the commodity product shelf of alcoholic beverages, associates the person information with the specified motion, and stores, in the motion history 33, the associated information for each commodity product category that is a commodity product item. Furthermore, regarding the commodity product item, for example, by previously designating a region, i.e., a region of interest (ROI), of each of the commodity product shelfs or the sales floor areas included in the image capturing region of the camera device 200, the fraud detection apparatus 10 is able to specify which commodity product item associated with the commodity product has been acquired by the person. Alternatively, on the basis of the installation area of the camera device 200, the fraud detection apparatus 10 may specify which commodity product item associated with the commodity product has been acquired by the person.

Then, the fraud detection apparatus 10 acquires the data on the person P from the motion history 33 illustrated in FIG. 16, and counts for each commodity product category, if the "motion" is "commodity product acquisition", a commodity product acquisition count by incrementing the commodity product acquisition count by one (+1). In contrast, if the "motion" is "commodity product return", the fraud detection apparatus 10 counts the commodity product acquisition count by decrementing the commodity product acquisition count by one (−1). By doing so, it is assumed that the commodity product acquisition count of the alcoholic beverages indicates three.

Figure 19:
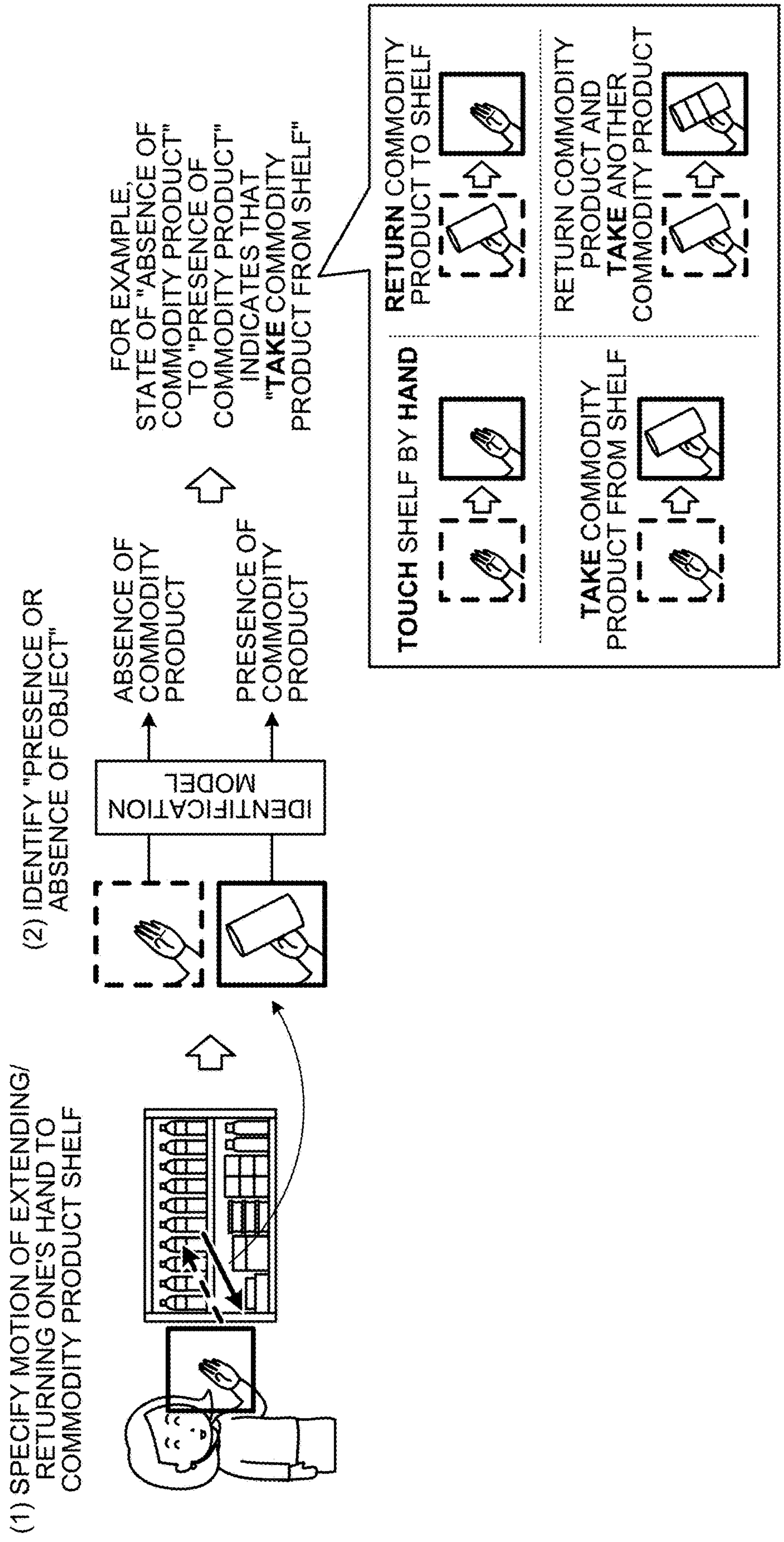
FIG. 19 is a diagram illustrating an example of specifying a commodity product acquisition/return motion according to the second embodiment.

Here, a method for acquiring or returning a commodity product will be described. FIG. 19 is a diagram illustrating an example of specifying a commodity product acquisition/return motion according to the second embodiment. As illustrated in FIG. 19, the fraud detection apparatus 10 specifies the hand and the commodity product shelf from the captured image captured by the camera device 200, and specifies, from the positional relationship between a bounding box (BBOX) of the hand and the ROI of the commodity product shelf, a motion of extending the hand to the commodity product shelf, or a motion of returning the hand from the commodity product shelf.

Then, the fraud detection apparatus 10 determines whether or not the person holds an object, that is, a commodity product, at the time of the specified motion of extending the hand or returning the hand by using a machine training model generated by being trained to identify presence or absence of an object from, for example, a part of the image of the hand included in the BBOX.

Furthermore, the fraud detection apparatus 10 determines more detailed motion of the person on the basis of a combination of a determination result indicating whether or not the person holds the commodity product associated with the motion of extending the hand and the motion of returning the hand. More specifically, for example, in the case where the person does not have the commodity product at the time of the motion of extending the hand and the person has the commodity product at the time of the motion of returning the hand, the fraud detection apparatus 10 is able to determine that the target person has acquired the commodity product from the commodity product shelf.

Furthermore, in the case where, for example, the target person does not have the commodity product at the time of both of the motion of extending the hand and the motion of returning the hand, the fraud detection apparatus 10 determines that the target person did not consequently acquire the commodity product even though the target person touched the commodity product shelf by the hand.

Furthermore, in the case where, for example, the target person has the commodity product at the time of the motion of extending the hand but does not have the commodity product at the time of the motion of returning the hand, the fraud detection apparatus 10 is able to determine that the target person has returned the commodity product to the commodity product shelf. Furthermore, in the case where, for example, the target person has the commodity product at the time of both of the motion of extending the hand and the motion of returning the hand, the fraud detection apparatus 10 is able to determine that the target person returned the commodity product to the commodity product shelf and has acquired another commodity product.

A description will be given here by referring back to FIG. 18. The fraud detection apparatus 10 specifies each of the persons who performs a procedure of calculation of a payment amount at the self-service checkout terminal 400 from the captured image having captured therein the cash register area, in which the self-service checkout terminal 400 is installed, captured by a camera device 200-*z*. Moreover, at this time, the fraud detection apparatus 10 may specify the self-service checkout terminal 400 that is used by the specified person from the plurality of the self-service checkout terminals 400, and may store the specified person in an associated manner with the specified self-service checkout terminal 400. Then, by using an existing technology, such as the Re-ID, the fraud detection apparatus 10 performs person re-identification from the image feature of the person specified from the cash register area, and then, determines whether the person specified from the captured image of each of the sales floors is the same person. The example illustrated in FIG. 18 indicates a state in which the fraud detection apparatus 10 specifies, from the captured image of the cash register area, the person P who performs a procedure of calculation of a payment amount at a self-service checkout terminal 400-*y*, and determines, on the basis of the captured image of the sales floor A, that the specified person P is the same as the person P who has been specified and who made a motion of acquiring the alcoholic beverages three times. Furthermore, in the example illustrated in FIG. 18, it is determined that a person Q is a person who is different from the person P; however, it is, of course, conceivable to be determined that the person Q is the same person who has been specified from another captured image.

Then, the fraud detection apparatus 10 compares the number of commodity products registered to the self-service checkout terminal 400-*y* or registered to the user terminal 100 that is used by the person P to the commodity product acquisition motion count of the person P. In the example illustrated in FIG. 18, an acquisition motion count of alcoholic beverages obtained by the person P is three times, whereas the number of commodity products registered by a commodity product scan is two, so that the fraud detection apparatus 10 determines that a scan omission has occurred. Furthermore, as illustrated in FIG. 18, if the fraud detection apparatus 10 determines that a scan omission has occurred, the fraud detection apparatus 10 notifies the store clerk terminal 300 of an alert.

Figure 20:
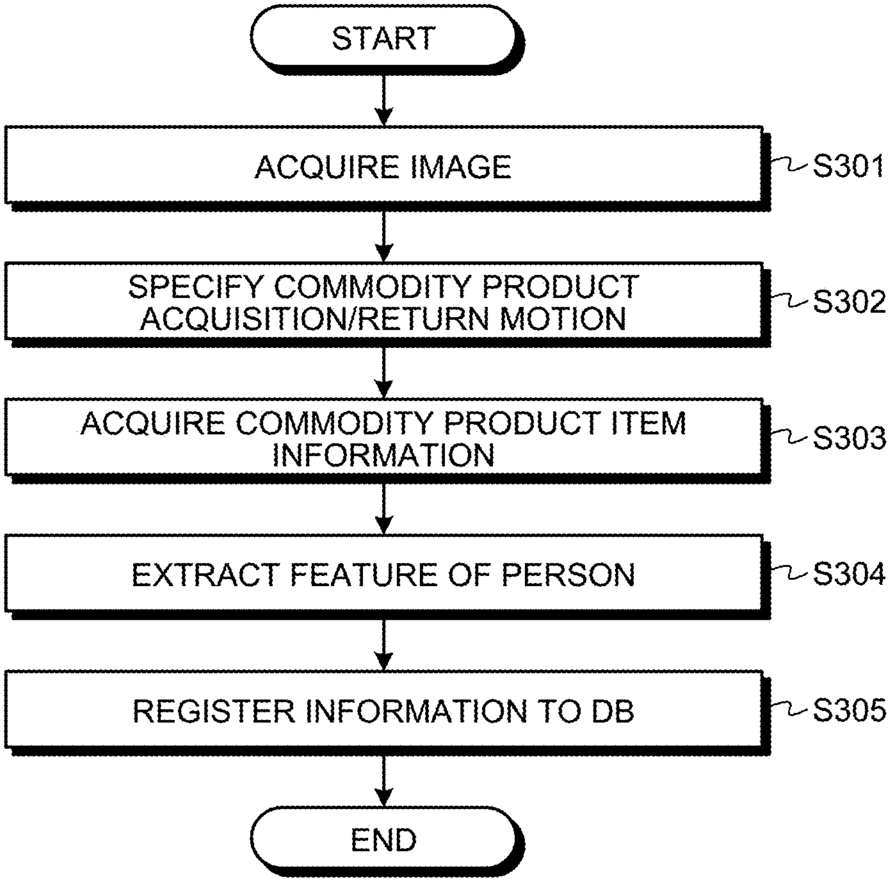
FIG. 20 is a flowchart illustrating the flow of a commodity product acquisition/return motion specifying process according to the second embodiment.

In the following, the flow of a commodity product acquisition/return motion specifying process performed by the fraud detection apparatus 10 will be described. FIG. 20 is a flowchart illustrating the flow of the commodity product acquisition/return motion specifying process according to the second embodiment. The commodity product acquisition/return motion specifying process illustrated in FIG. 20 may be performed at, for example, regular intervals or every time a captured image is received from the camera device 200.

First, as illustrated in FIG. 20, the fraud detection apparatus 10 acquires, from the image DB 31, the captured image having captured therein a predetermined sales floor captured by the camera device 200 (Step S301). Furthermore, in the commodity product acquisition/return motion specifying process illustrated in FIG. 20, the captured image captured by the camera device 200, in a precise sense, a monitoring video image, is processed in real time, so that the captured image is transmitted from the camera device 200 as needed, and is stored in the image DB 31.

Then, by using, for example, the existing technology, the fraud detection apparatus 10 specifies a person or an object from the captured image acquired at Step S301, detects skeletons of the person, and specifies a motion of the person acquiring the commodity product, or a motion of returning the commodity product (Step S302). Moreover, the object that is specified here may be a commodity product, a commodity product shelf, or the like.

Then, on the basis of, for example, the ROI of the commodity product shelf specified from the captured image acquired at Step S301, an installation area of the camera device 200, or the like, the fraud detection apparatus 10 acquires the commodity product item information on the commodity product that has been acquired or returned at Step S302 (Step S303).

Then, the fraud detection apparatus 10 uses, for example, the existing technology, and extract the feature information on the person specified at Step S302 from the captured image acquired at Step S301 (Step S304). Moreover, the feature information on the person extracted here may be, as described above, for example, the image feature of the body of the person, the image feature amount based on the Re-ID, an image feature related to the skeletons obtained from the skeleton estimation of the person, or the like.

In addition, the fraud detection apparatus 10 registers and stores, in a DB, for example, in the motion history 33 in an associated manner, the motion specified at Step S302, the commodity product item information acquired at Step S303, the feature information on the person extracted at Step S304, the time information, and the like (Step S305). After having performed the process at Step S305, the commodity product acquisition/return motion specifying process illustrated in FIG. 20 is ended.

Figure 21:
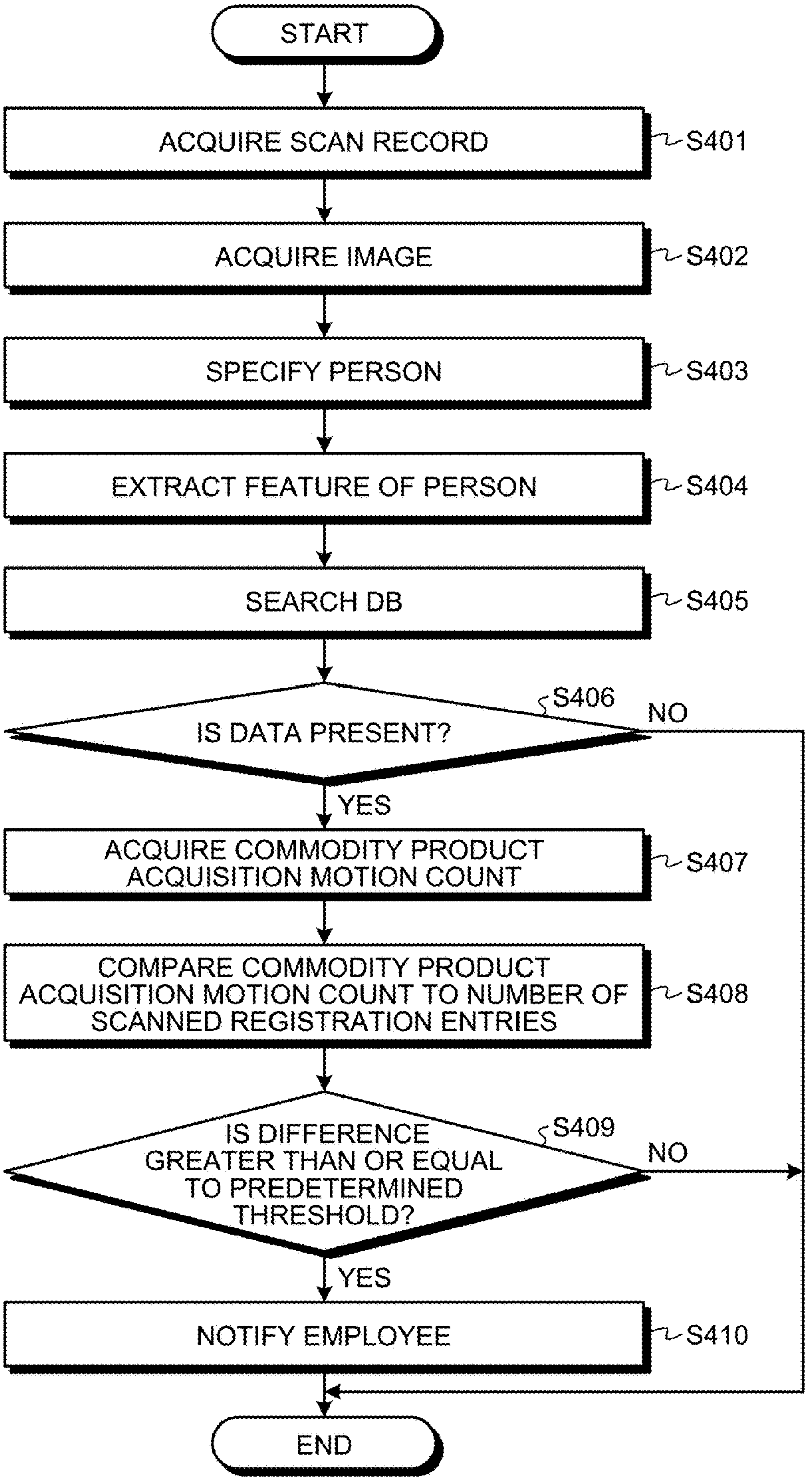
FIG. 21 is a flowchart illustrating the flow of a scan omission detection process according to the second embodiment.

In the following, the flow of a scan omission detection process performed by the fraud detection apparatus 10 will be described. FIG. 21 is a flowchart illustrating the flow of the scan omission detection process according to the second embodiment.

The scan omission detection process illustrated in FIG. 21 may be performed at, for example, regular intervals or every time a signal indicating, for example, the start of a process of calculation of a payment amount has been received from the self-service checkout terminal 400 or every time a captured image is received from the camera device 200.

First, as illustrated in FIG. 21, the fraud detection apparatus 10 acquires, from the commodity product registration information 34, a scan record of the commodity product targeted for a purchase that has been registered by scanning each of the commodity products by using the user terminal 100, such as the number of scanned registration entries for each commodity product item (Step S401). Moreover, in the scan omission detection process illustrated in FIG. 21, the scan record of the commodity product targeted for a purchase is received from the user terminal 100 by the self-service checkout terminal 400, is further transmitted to the fraud detection apparatus 10, and is stored in the commodity product registration information 34.

Then, the fraud detection apparatus 10 acquires, from the image DB 31, the captured image that has been captured by the camera device 200 and that has therein the cash register area in which the target self-service checkout terminal 400 is installed (Step S402). Moreover, in the scan omission detection process illustrated in FIG. 21, the captured image captured by the camera device 200, in a precise sense, a monitoring video image, is processed in real time, so that the captured image is transmitted from the camera device 200 as needed, and is stored in the image DB 31.

Then, the fraud detection apparatus 10 specifies, by using, for example, the existing technology, the person from the captured image that is acquired at Step S402 (Step S403).

Then, the fraud detection apparatus 10 uses, for example, the existing technology, and extracts, from the captured image acquired at Step S402, the feature information on the person specified at Step S403 (Step S404). Moreover, the feature information on the person extracted here may be, as described above, for example, the image feature of the body of the person, the image feature amount based on the Re-ID, an image feature related to the skeletons obtained from the skeleton estimation of the person, or the like.

Then, the fraud detection apparatus 10 searches, on the basis of the feature information on the person extracted at Step S404 or the like, the DB, for example, the motion history 33 (Step S405). If the result of the search of the DB performed at Step S405 indicates that the data on the target person is not stored (No at Step S406), the scan omission detection process indicated in FIG. 21 is ended.

In contrast, if the data on the target person is stored in the motion history 33 (Yes at Step S406), the fraud detection apparatus 10 acquires and accumulates the pieces of data on the target person from the motion history 33, and then, counts and acquires the commodity product acquisition motion count (Step S407).

Then, the fraud detection apparatus 10 compares the commodity product acquisition motion count acquired at Step S407 to the number of scanned registration entries acquired at Step S401 (Step S408). If the difference between the commodity product acquisition motion count and the number of scanned registration entries is less than a predetermined threshold (No at Step S409), the scan omission detection process illustrated in FIG. 21 is ended.

In contrast, if the difference between the commodity product acquisition motion count and the number of scanned registration entries is greater than or equal to the predetermined threshold (Yes at Step S409), the fraud detection apparatus 10 determines that the target person has behaved fraudulently or performed an erroneous operation and notifies the store clerk terminal 300 that is used by an employee who is in charge of, for example, a cash register area of an alert (Step S410). After having performed the process at Step S410, the scan omission detection process illustrated in FIG. 21 is ended.

EFFECTS

As described above, the fraud detection apparatus 10 specifies, from the captured image, a person who is visiting the store and an object that is used by the person; generates the skeleton information 32 on the person specified from the image; specifies, on the basis of the specified object and the skeleton information 32, the first motion of the person acquiring the commodity product sold in the store; counts the second count that indicates the number of times the commodity product targeted for a purchase has been registered to the first terminal by the person; and evaluates, on the basis of the first count of the specified first motion and the counted second count, a behavior of the person exhibiting with respect to the purchase of the commodity product.

As a result, the fraud detection apparatus 10 evaluates the behavior of the customer on the basis of the number of motions of acquiring the commodity products and the number of scanned registration entries, so that the fraud detection apparatus 10 is able to detect a scan omission of a commodity product in a system in which customers perform commodity product scans by themselves.

Furthermore, the process of evaluating the behavior performed by the fraud detection apparatus 10 includes a process of determining that the person has behaved fraudulently or performed an erroneous operation when a difference between the first count and the second count is greater than or equal to the first threshold and when the first count is greater than or equal to the second threshold, and, if it is determined that the person has behaved fraudulently or performed an erroneous operation, the fraud detection apparatus 10 notifies the store clerk terminal 300 that is the second terminal of an alert.

As a result, in the system in which the customers perform commodity product scans by themselves, the fraud detection apparatus 10 is able to notify the store clerk when a scan omission of the commodity product is detected.

Furthermore, the fraud detection apparatus 10 specifies the second motion of the person registering the commodity product targeted for a purchase to the first terminal on the basis of the specified object and the skeleton information; the process of specifying the first motion performed by the fraud detection apparatus 10 includes a process of specifying, on the basis of the specified object and the skeleton information 32, the first motion in the case where the fingers of the person have come out from the region of the basket after the fingers entered the region of the basket for a predetermined period of time; and the process of specifying the second motion performed by the fraud detection apparatus 10 includes a process of specifying, on the basis of the specified object and the skeleton information 32, the second motion in the case where the both elbows of the person have not moved for a predetermined time period while being bent forward within a predetermined range of a the region of the specified basket.

As a result, in the system in which the customers perform commodity product scans by themselves, the fraud detection apparatus 10 is able to more accurately specify each of the motions that have been made by the persons with respect to the commodity products and is able to the registration motion of the commodity product and detect the scan omission of the commodity product.

Furthermore, the process of specifying the person performed by the fraud detection apparatus 10 includes a process of tracking, from captured images that are captured at different time, the same person at different time on the basis of an appearance and an amount of movement of the person.

As a result, in the system in which the customers perform commodity product scans by themselves, the fraud detection apparatus 10 is able to track and detect the target person for a scan omission of the commodity product.

Furthermore, the process of counting the first count and the second count and the process of evaluating the behavior performed by the fraud detection apparatus 10 are executed when the second motion of the person registering the commodity product targeted for the purchase to the first terminal is not specified after the first motion is specified.

As a result, in the system in which the customers perform commodity product scans by themselves, the fraud detection apparatus 10 is able to detect a scan omission of a commodity product of a target person for self scanning without erroneously detecting a target person for normal cash register.

Furthermore, the process of evaluating the behavior performed by the fraud detection apparatus 10 includes a process of determining that the person has behaved fraudulently in the case where the person has been specified from the image having captured therein a sales floor of a high-priced commodity product and in the case where the difference is greater than or equal to the third threshold even when the difference between the first count and the second count is less than the first threshold.

As a result, in the system in which the customers perform commodity product scans by themselves, the fraud detection apparatus 10 is able to more accurately detect the scan omission of the high-priced commodity product.

Furthermore, the fraud detection apparatus 10 specifies, from a first image having captured therein an area that includes a shelf on which the commodity products in the store are accommodated, a motion of the first person acquiring a commodity product from the shelf; specifies the first person and the self-service checkout terminal 400 from a second image having captured therein the area that includes the self-service checkout terminal 400; stores the first person and the self-service checkout terminal 400 in an associated manner; receives a purchase history from the self-service checkout terminal 400 that is associated with the first person; and specifies the second count on the basis of the purchase history.

As a result, in the system in which the customers perform commodity product scans by themselves, the fraud detection apparatus 10 is able to more accurately detect a scan omission of a commodity product.

Furthermore, the fraud detection apparatus 10 specifies an area in which the first person is located in the store when the fraud detection apparatus 10 specifies a third motion of the first person putting a commodity product into a basket; specifies, on the basis of a type of the commodity product associated with the specified area, a first category item indicating the type of the commodity product that has been put into the basket out of the category items indicating the types of the plurality of commodity products; counts a third count of the third motion that has been made with respect to the specified first category item; counts, on the basis of the received purchase history, the second count performed with respect to the first category item; and evaluates the behavior of the first person exhibiting with respect to a purchase of the commodity product on the basis of the number of counts of the third motion that has been made with respect to the first category item and the second count performed with respect to the first category item.

As a result, in the system in which the customers perform commodity product scans by themselves, the fraud detection apparatus 10 is able to detect, for each commodity product item, a scan omission of the commodity product.

Furthermore, the first terminal is a terminal that stores therein information that is related to the commodity product targeted for the purchase and that is obtained by scanning a bar code or a QR code attached to the commodity product.

As a result, in the system in which the customers perform commodity product scans by themselves, the fraud detection apparatus 10 is able to detect a scan omission of a commodity product.

Furthermore, the first terminal is the self-service checkout terminal 400 and specifies the second count on the basis of the information transmitted from the terminal that stores therein the information that is related to the commodity product targeted for the purchase and that is obtained by scanning a bar code or a QR code attached to the commodity product.

As a result, in the system in which the customers perform commodity product scans by themselves, the fraud detection apparatus 10 is able to detect a scan omission of a commodity product.

System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Hardware

Figure 12:
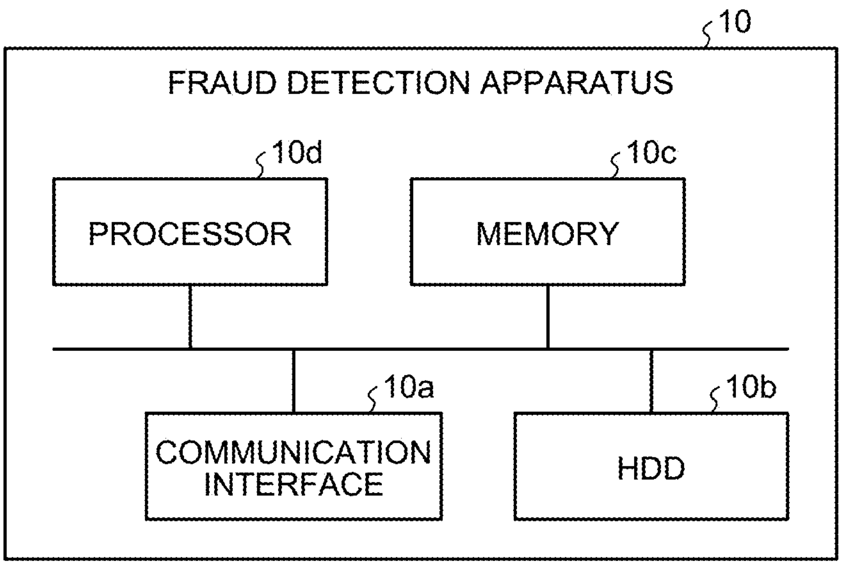
FIG. 12 is a diagram illustrating a hardware configuration example of the fraud detection apparatus 10.

In the following, a hardware configuration of each of the devices used in each of the first embodiment and the second embodiment will be described. FIG. 12 is a diagram illustrating a hardware configuration example of the fraud detection apparatus 10. As illustrated in FIG. 12, the fraud detection apparatus 10 includes a communication interface 10*a*, a hard disk drive (HDD) 10*b*, a memory 10*c*, and a processor 10*d*. Furthermore, each of the units illustrated in FIG. 12 is connected each other via a bus or the like. Furthermore, FIG. 12 illustrates the hardware configuration of the fraud detection apparatus 10; however, the store clerk terminal 300 may also have the same configuration as that of the fraud detection apparatus 10.

The communication interface 10*a* is a network interface card or the like and communicates with another server. The HDD 10*b* stores therein programs or the DB that operates the function illustrated in FIG. 5.

The processor 10*d* is a hardware circuit that operates the process that executes each of the functions described above in FIG. 5 or the like by reading the programs that execute the same process as that performed by each of the processing units illustrated in FIG. 5 from the HDD 10*b* or the like and loading the read programs in the memory 10*c*. In other words, the process executes the same function as that performed by each of the processing units included in the fraud detection apparatus 10. Specifically, the processor 10*d* reads, from the HDD 10*b* or the like, the programs having the same function as that performed by the specifying unit 41, the generating unit 42, the evaluating unit 43, the notifying unit 44, and the like. Then, the processor 10*d* executes the process for executing the same processes as those performed by the specifying unit 41 and the like.

In this way, the fraud detection apparatus 10 is operated as an information processing apparatus that executes a motion control process by reading and executing the programs that execute the same process as those performed by each of the processing units illustrated in FIG. 5. Furthermore, the fraud detection apparatus 10 can also implement the same function as that described above in the embodiment by reading the programs from a recording medium by a medium recording device and executing the read programs. Furthermore, the programs described in another embodiment are not limited to be executed by the fraud detection apparatus 10. For example, the present embodiment may also be similarly used in a case in which another computer or a server executes a program or in a case in which another computer and a server cooperatively execute the program with each other.

The programs that execute the same process as those performed by each of the processing units illustrated in FIG. 5 can be distributed via a network, such as the Internet. Furthermore, the programs can be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

Figure 22:
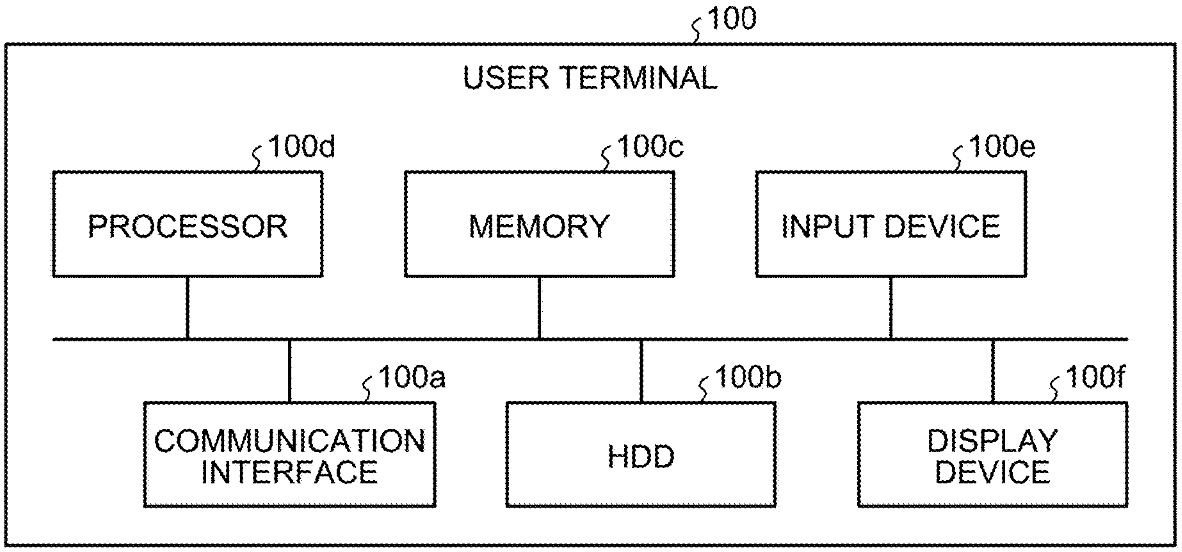
FIG. 22 is a diagram illustrating an example of a hardware configuration of a user terminal 100.

FIG. 22 is a diagram illustrating hardware configuration example of the user terminal 100. As illustrated in FIG. 22, the user terminal 100 includes a communication interface 100*a*, an HDD 100*b*, a memory 100*c*, a processor 100*d*, an input device 100*e*, and a display device 100*f*. Furthermore, each of the units illustrated in FIG. 22 is connected each other via a bus or the like.

The communication interface 100*a* is a network interface card or the like and communicates with another information processing apparatus. The HDD 100*b* stores therein programs and data that operate each of the functions of the user terminal 100.

The processor 100*d* is a hardware circuit that operates the process that executes each of the functions of the user terminal 100 by reading the program that executes each of the functions of the user terminal 100 from the HDD 100*b* or the like and loading the read program in the memory 100*c*. In other words, the process executes the same function as that performed by each of the processing units included in the user terminal 100.

In this way, the user terminal 100 is operated as an information processing apparatus that executes a motion control process by reading and executing the programs that execute a process performed by each of the functions of the user terminal 100. Furthermore, the user terminal 100 is also able to implement each of the functions of the user terminal 100 by reading the programs from a recording medium by a medium recording device and executing the read programs. Furthermore, the programs described in another embodiment are not limited to be executed by the user terminal 100. For example, the present embodiment may also be similarly used in a case in which another computer or a server executes a program or in a case in which another computer and a server cooperatively execute the program with each other.

Furthermore, the programs that execute the process of each of the functions of the user terminal 100 is able to be distributed via a network, such as the Internet. Furthermore, the programs are able to be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input device 100*e* detects various input operations performed by a user, such as an input operation performed with respect to the programs executed by the processor 100*d*. Examples of the input operation include a touch operation or an operation of inserting an earphone terminal into the user terminal 100. The touch operation mentioned here indicates various motions of touching the display device 100*f*, such as a tap, a double tap, a swipe, or a pinch. Furthermore, the touch operation includes, for example, a motion of an object, such as a finger, approaching the display device 100*f*. The input device 100*e* may be, for example, a button, a touch panel, a proximity sensor, or the like.

The display device 100*f* displays various kinds of visual information based on the control performed by the processor 100*d*. The display device 100*f* may be a liquid crystal display (LCD), an organic light emitting diode (OLED), such as an organic electro luminescence (EL) display.

Figure 23:
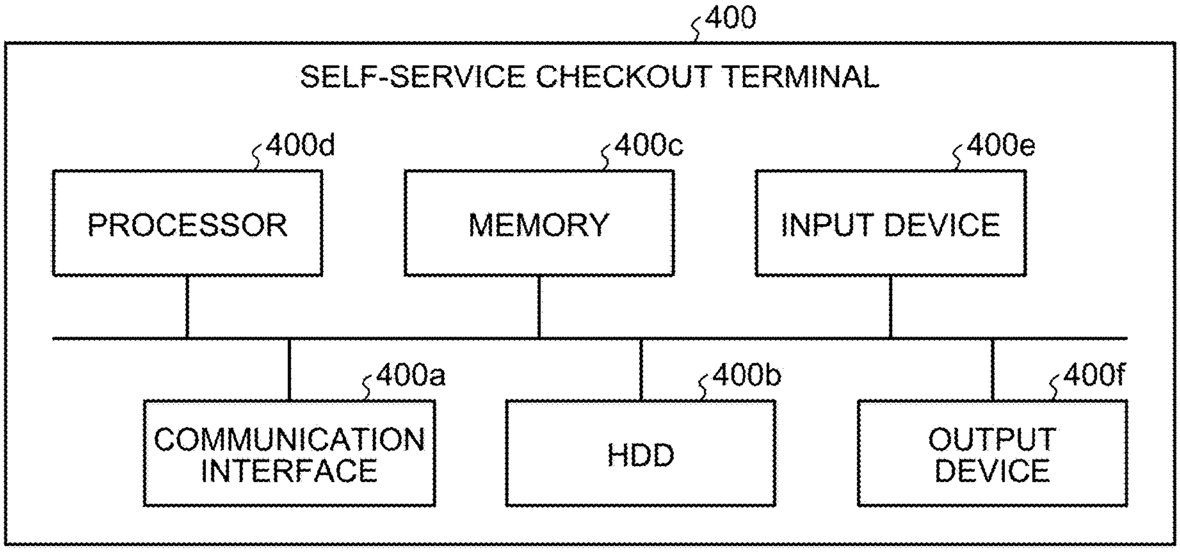
FIG. 23 is a diagram illustrating an example of a hardware configuration according to a self-service checkout terminal 400.

FIG. 23 is a diagram illustrating a hardware configuration example of the self-service checkout terminal 400. As illustrated in FIG. 23, the self-service checkout terminal 400 includes a communication interface 400*a*, an HDD 400*b*, a memory 400*c*, a processor 400*d*, an input device 400*e*, and an output unit 400*f*. Furthermore, each of the units illustrated in FIG. 23 is connected each other via a bus or the like.

The communication interface 400*a* is a network interface card or the like and communicates with another information processing apparatus. The HDD 400*b* stores therein programs and data that operate each of the functions of the self-service checkout terminal 400.

The processor 400*d* is a hardware circuit that operates the process that executes each of the functions of the self-service checkout terminal 400 by reading the program from the HDD 400*b* or the like and loading the read program in the memory 400*c*. In other words, the process executes the same function as that performed by each of the processing units included in the self-service checkout terminal 400.

In this way, the self-service checkout terminal 400 is operated as an information processing apparatus that executes a motion control process by reading and executing the programs that execute a process performed by each of the self-service checkout terminal 400. Furthermore, the self-service checkout terminal 400 is also able to implement each of the functions of the self-service checkout terminal 400 by reading the programs from a recording medium by a medium recording device and executing the read programs. Furthermore, the programs described in another embodiment are not limited to be executed by the self-service checkout terminal 400. For example, the present embodiment may also be similarly used in a case in which another computer or a server executes a program or in a case in which another computer and a server cooperatively execute the program with each other.

Furthermore, the programs that execute the process of each of the functions of the self-service checkout terminal 400 is able to be distributed via a network, such as the Internet. Furthermore, the programs are able to be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input device 400*e* detects various input operations performed by a user, such as an input operation performed with respect to the programs executed by the processor 400*d*. An example of the input operation includes a touch operation. In a case of the touch operation, the self-service checkout terminal 400 further includes a display device, and an input operation detected by the input device 400*e* may be a touch operation performed on the display device. The input device 400*e* may be, for example, a button, a touch panel, a proximity sensor, or the like.

The output unit 400*f* outputs data that is output from the program executed by the processor 400*d* via an external device connected to the self-service checkout terminal 400, such as, an external display device. Furthermore, in the case where the self-service checkout terminal 400 includes a display device, the self-service checkout terminal 400 need not include the output unit 400*f*.

According to an aspect of an embodiment, it is possible to detect a scan omission of a commodity product in the system in which the customers perform commodity product scans by themselves.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:

detecting a person and commodity products sold in a store by analyzing consecutive image frames captured by a first camera installed inside of the store;

generating by inputting each of the consecutive image frames including the person into a machine learning model, skeleton information on the person on each of the consecutive image frames, the skeleton information on the person including a position of fingers of the person;

determining whether or not the person holds a commodity product associated with a motion of extending a hand of the person by using partial images including the position of fingers within the consecutive image frames where a motion of the extending a hand detected from the skeleton information is detected and an object detection algorithm that identifies an object presence;

determining whether or not the person holds a commodity product associated with a motion of returning the hand of the person by using partial images including the position of fingers within the consecutive image frames where a motion of the extending a hand detected from the skeleton information is detected and the object detection algorithm;

determining an occurrence of a first motion of the person acquiring the commodity product, when determining that the person does not hold the commodity product at a time of the motion of extending the hand and determining that the person holds the commodity product at a time of the motion of returning the hand on each of the consecutive image frames;

generating, at a time of determining the occurrence of the first motion, first information where an identification of the person and the first motion are associated, and storing the first information in a motion history, wherein the motion history stores feature information on the person extracted from the consecutive image frames captured by the first camera;

determining an occurrence of a second motion of the person returning the commodity product, when determining that the person holds the commodity product at a time of the motion of extending the hand and determining that the person does not hold the commodity product at a time of the motion of returning the hand on each of the consecutive image frames;

generating at a time of determining the occurrence of the second motion, second information where the identification of the person and the second motion are associated, and storing the second information in the motion history by appending the second information to the first information;

counting an acquisition count by referring to the motion history and incrementing the acquisition count for the first motion of the person or decrementing the acquisition count for the second motion of the person;

identifying the person who is captured in consecutive image frames captured by a second camera capturing therein an area that includes a self-service checkout terminal and is a same person whose identification is stored in the motion history, by performing person re-identification that compares the feature information stored in the motion history with feature information on the person extracted from the captured consecutive image frames from the second camera;

receiving commodity product information via a network from the self-service checkout terminal that the identified person uses, wherein the commodity product information is information transmitted from a first terminal that is used by the person and stores therein a registered commodity product by scanning a code of a commodity product, and detecting a number of registrations indicating a number of scanned commodity products based on the received commodity product information;

generating, based on a difference between the detected number of registrations and the counted acquisition count, an alert that indicates a commodity product put into a shopping basket by the person is not registered in the first terminal; and transmitting the generated alert to a second terminal via the network, wherein the first terminal is a terminal that stores therein information on the commodity product targeted for the purchase by scanning a bar code or a QR code attached to the commodity product.

2. The non-transitory computer-readable recording medium according to claim 1, wherein the evaluating the behavior includes determining that the person behaves fraudulently or performs an erroneous operation when the difference between the first count and the second count is greater than or equal to a first threshold and when the first count is greater than or equal to a second threshold, wherein the process further comprises notifying, when it is determined that the person behaves fraudulently or performs the erroneous operation, a second terminal of the alert.

3. The non-transitory computer-readable recording medium according to claim 1, wherein detecting the first motion includes detecting, based on the detected commodity products and the skeleton information, the first motion when fingers of the person have come out from a region of the detected basket after the fingers entered the region of the detected basket for a predetermined time period, and detecting the second motion includes detecting, based on the detected commodity products and the skeleton information, the second motion when both elbows of the person have not moved for a predetermined time period while being bent forward within a predetermined range of the region of the detected basket.

4. The non-transitory computer-readable recording medium according to claim 1, wherein detecting the person includes tracking, from a plurality of images captured at different time, based on an appearance and an amount of movement of the person, the same person at the different time.

5. The non-transitory computer-readable recording medium according to claim 1, wherein the counting the first motion and the second motion, and the evaluating the behavior are executed when the second motion of the person registering the commodity product targeted for the purchase to the first terminal is not detected after the first motion is detected.

6. The non-transitory computer-readable recording medium according to claim 2, wherein the evaluating the behavior includes determining that the person behaves fraudulently or performs the erroneous operation when the person is detected from the image capturing therein a sales floor of a high-priced commodity product and when the difference is greater than or equal to a third threshold even when the difference is less than the first threshold.

7. The non-transitory computer-readable recording medium according to claim 1, wherein the process further comprises:

detecting, from a first image capturing therein an area that includes a shelf on which the commodity products in the store are accommodated, a motion of a first person acquiring a commodity product from the shelf;

detecting, from a second image capturing therein an area that includes a self-service checkout terminal, the first person and the self-service checkout terminal;

storing, in an associated manner, the first person and the self-service checkout terminal;

receiving a purchase history from the self-service checkout terminal that is associated with the first person; and detecting, based on the purchase history, the second count.

8. The non-transitory computer-readable recording medium according to claim 7, wherein the process further comprises:

detecting an area in which the first person is located in the store when a third motion of the first person putting the commodity product into the basket;

detecting, based on a type of the commodity product associated with the detected area, a first category item that indicates the type of the commodity product put into the basket out of category items indicating types of a plurality of commodity products;

counting a third count of the third motion for the detected first category item;

counting, based on the purchase history, the second count performed with respect to the first category item; and evaluating, based on the number of counts of the third motion for the first category item and the second count performed with respect to the first category item, the behavior of the first person exhibiting with respect to the purchase of the commodity product.

9. The non-transitory computer-readable recording medium according to claim 1, wherein the first terminal is a self-service checkout terminal, and the first terminal detects the second count based on information transmitted from a terminal that stores therein information on the commodity product targeted for the purchase by scanning a bar code or a QR code attached to the commodity product.

10. An information processing method comprising:

detecting a person and commodity products sold in a store by analyzing consecutive image frames captured by a first camera installed inside of the store;

generating by inputting each of the consecutive image frames including the person into a machine learning model, skeleton information on the person on each of the consecutive image frames, the skeleton information on the person including a position of fingers of the person;

determining whether or not the person holds a commodity product associated with a motion of extending a hand of the person by using partial images including the position of fingers within the consecutive image frames where a motion of the extending a hand detected from the skeleton information is detected and an object detection algorithm that identifies an object presence;

determining whether or not the person holds a commodity product associated with a motion of returning the hand of the person by using partial images including the position of fingers within the consecutive image frames where a motion of the extending a hand detected from the skeleton information is detected and the object detection algorithm;

determining an occurrence of a first motion of the person acquiring the commodity product, when determining that the person does not hold the commodity product at a time of the motion of extending the hand and determining that the person holds the commodity product at a time of the motion of returning the hand on each of the consecutive image frames;

generating, at a time of determining the occurrence of the first motion, first information where an identification of the person and the first motion are associated, and storing the first information in a motion history, wherein the motion history stores feature information on the person extracted from the consecutive image frames captured by the first camera;

determining an occurrence of a second motion of the person returning the commodity product, when determining that the person holds the commodity product at a time of the motion of extending the hand and determining that the person does not hold the commodity product at a time of the motion of returning the hand on each of the consecutive image frames;

generating at a time of determining the occurrence of the second motion, second information where the identification of the person and the second motion are associated, and storing the second information in the motion history by appending the second information to the first information;

counting an acquisition count by referring to the motion history and incrementing the acquisition count for the first motion of the person or decrementing the acquisition count for the second motion of the person;

identifying the person who is captured in consecutive image frames captured by a second camera capturing therein an area that includes a self-service checkout terminal and is a same person whose identification is stored in the motion history, by performing person re-identification that compares the feature information stored in the motion history with feature information on the person extracted from the captured consecutive image frames from the second camera;

receiving commodity product information via a network from the self-service checkout terminal that the identified person uses, wherein the commodity product information is information transmitted from a first terminal that is used by the person and stores therein a registered commodity product by scanning a code of a commodity product, and detecting a number of registrations indicating a number of scanned commodity products based on the received commodity product information;

generating, based on a difference between the detected number of registrations and the counted acquisition count, an alert that indicates a commodity product put into a shopping basket by the person is not registered in the first terminal; and transmitting the generated alert to a second terminal via the network, wherein the first terminal is a terminal that stores therein information on the commodity product targeted for the purchase by scanning a bar code or a QR code attached to the commodity product.

11. An information processing apparatus, comprising:

a memory; and a processor coupled to the memory and the processor configured to:

detect a person and commodity products sold in a store by analyzing consecutive image frames captured by a first camera installed inside of the store;

generate by inputting each of the consecutive image frames including the person into a machine learning model, skeleton information on the person on each of the consecutive image frames, the skeleton information on the person including a position of fingers of the person;

determine whether or not the person holds a commodity product associated with a motion of extending a hand of the person by using partial images including the position of fingers within the consecutive image frames where a motion of the extending a hand detected from the skeleton information is detected and an object detection algorithm that identifies an object presence;

determine whether or not the person holds a commodity product associated with a motion of returning the hand of the person by using partial images including the position of fingers within the consecutive image frames where a motion of the extending a hand detected from the skeleton information is detected and the object detection algorithm;

determining an occurrence of a first motion of the person acquiring the commodity product, when determining that the person does not hold the commodity product at a time of the motion of extending the hand and determining that the person holds the commodity product at a time of the motion of returning the hand on each of the consecutive image frames;

generating, at a time of determining the occurrence of the first motion, first information where an identification of the person and the first motion are associated, and storing the first information in a motion history, wherein the motion history stores feature information on the person extracted from the consecutive image frames captured by the first camera;

determining an occurrence of a second motion of the person returning the commodity product, when determining that the person holds the commodity product at a time of the motion of extending the hand and determining that the person does not hold the commodity product at a time of the motion of returning the hand on each of the consecutive image frames;

generating at a time of determining the occurrence of the second motion, second information where the identification of the person and the second motion are associated, and storing the second information in the motion history by appending the second information to the first information;

counting an acquisition count by referring to the motion history and incrementing the acquisition count for the first motion of the person or decrementing the acquisition count for the second motion of the person;

identifying the person who is captured in consecutive image frames captured by a second camera capturing therein an area that includes a self-service checkout terminal and is a same person whose identification is stored in the motion history, by performing person re-identification that compares the feature information stored in the motion history with feature information on the person extracted from the captured consecutive image frames from the second camera;

receiving commodity product information via a network from the self-service checkout terminal that the identified person uses, wherein the commodity product information is information transmitted from a first terminal that is used by the person and stores therein a registered commodity product by scanning a code of a commodity product, and detecting a number of registrations indicating a number of scanned commodity products based on the received commodity product information;

generating, based on a difference between the detected number of registrations and the counted acquisition count, an alert that indicates a commodity product put into a shopping basket by the person is not registered in the first terminal; and transmitting the generated alert to a second terminal via the network, wherein the first terminal is a terminal that stores therein information on the commodity product targeted for the purchase by scanning a bar code or a QR code attached to the commodity product.

12. The information processing apparatus according to claim 11, wherein the processor is further configured to evaluate the behavior by determining that the person behaves fraudulently or performs an erroneous operation when the difference between the first count and the second count is greater than or equal to a first threshold and when the first count is greater than or equal to a second threshold, and notify, when it is determined that the person behaves fraudulently or performs the erroneous operation, a second terminal of the alert.

13. The information processing apparatus according to claim 12, wherein the evaluating the behavior includes determining that the person behaves fraudulently or performs the erroneous operation when the person is detected from the image capturing therein a sales floor of a high-priced commodity product and when the difference is greater than or equal to a third threshold even when the difference is less than the first threshold.

14. The information processing apparatus according to claim 11, wherein detecting the first motion includes detecting, based on the detected commodity products and the skeleton information, the first motion when fingers of the person have come out from a region of the detected basket after the fingers entered the region of the detected basket for a predetermined time period, and detecting the second motion includes detecting, based on the detected commodity products and the skeleton information, the second motion when both elbows of the person have not moved for a predetermined time period while being bent forward within a predetermined range of the region of the detected basket.

15. The information processing apparatus according to claim 11, wherein the processor is further configured to wherein detecting the person includes tracking, from a plurality of images captured at different time, based on an appearance and an amount of movement of the person, the same person at the different time.

16. The information processing apparatus according to claim 11, wherein the counting the first motion and the second motion, and the evaluating the behavior are executed when the second motion of the person registering the commodity product targeted for the purchase to the first terminal is not detected after the first motion is detected.

17. The information processing apparatus according to claim 11, wherein the processor is further configured to:

detect, from a first image capturing therein an area that includes a shelf on which the commodity products in the store are accommodated, a motion of a first person acquiring the commodity product from the shelf;

detect, from a second image capturing therein an area that includes a self-service checkout terminal, the first person and the self-service checkout terminal;

send, in an associated manner, the first person and the self-service checkout terminal to be stored in the memory;

receive a purchase history from the self-service checkout terminal that is associated with the first person; and detect, based on the purchase history, the second count.

18. The information processing apparatus according to claim 17, wherein the processor is further configured to:

detect an area in which the first person is located in the store when a third motion of the first person putting the commodity product into the basket;

detect, based on a type of the commodity product associated with the detected area, a first category item that indicates the type of the commodity product put into the basket out of category items indicating types of a plurality of commodity products;

count a third count of the third motion for the detected first category item;

count, based on the purchase history, the second count performed with respect to the first category item; and evaluate, based on the number of counts of the third motion for the first category item and the second count performed with respect to the first category item, the behavior of the first person exhibiting with respect to the purchase of the commodity product.

19. The information processing apparatus according to claim 11, wherein the first terminal is a self-service checkout terminal, and the first terminal detects the second count based on information transmitted from a terminal that stores therein information on the commodity product targeted for the purchase by scanning a bar code or a QR code attached to the commodity product.

* * * * *